US012394294B2

(12) United States Patent
Baillargeon et al.

(10) Patent No.: US 12,394,294 B2
(45) **Date of Patent: *Aug. 19, 2025**

(54) WARNING AND MESSAGE DELIVERY AND LOGGING SYSTEM UTILIZABLE IN THE MONITORING OF FALL ARRESTING AND PREVENTION DEVICES AND METHOD OF SAME

(71) Applicants: Terex South Dakota, Inc., Westport, CT (US); O.E.M. Controls, Inc., Shelton, CT (US)

(72) Inventors: Paul D. Baillargeon, Suncook, NH (US); Van Walbridge, Arvada, CO (US)

(73) Assignees: O.E.M Controls, Inc., Shelton, CT (US); Terex South Dakota, Inc., Norwalk, CT (US)

( * ) Notice: Subject to any disclaimer, the term of this patent is extended or adjusted under 35 U.S.C. 154(b) by 971 days.

This patent is subject to a terminal disclaimer.

(21) Appl. No.: 17/074,117

(22) Filed: Oct. 19, 2020

(65) Prior Publication Data

US 2021/0035428 A1 Feb. 4, 2021

Related U.S. Application Data

(63) Continuation of application No. 14/972,788, filed on Dec. 17, 2015, now Pat. No. 10,810,851, which is a (Continued)

(51) Int. Cl.

*G08B 21/02* (2006.01)
*B66F 11/04* (2006.01)
(Continued)

(52) U.S. Cl.

CPC .............. *G08B 21/02* (2013.01); *B66F 11/04* (2013.01); *B66F 11/044* (2013.01); (Continued)

(58) Field of Classification Search

CPC .. G08B 21/02; G08B 21/182; G08B 21/0222; G08B 21/0446; G08B 21/10; (Continued)

(56) References Cited

U.S. PATENT DOCUMENTS

| | | | |
|---|---|---|---|
| 3,809,180 | A | 5/1974 | Grove |
| 3,817,346 | A | 6/1974 | Wehmeyer |

(Continued)

FOREIGN PATENT DOCUMENTS

| | | | |
|---|---|---|---|
| GB | 2482853 | A | 2/2012 |
| JP | 2000318990 | A | 11/2000 |

(Continued)

OTHER PUBLICATIONS

Final Office Action for U.S. Appl. No. 13/369,749 dated Jun. 20, 2014; 20 pps.

(Continued)

*Primary Examiner* — Daniel P Cahn
*Assistant Examiner* — Shiref M Mekhaeil
(74) *Attorney, Agent, or Firm* — Simmons Perrine Moyer Bergman PLC

(57) ABSTRACT

An active interface monitoring and warning system for fall arresting/prevention devices delivering specific fault condition messages to individuals who are subject to accidental falls or other safety hazards when performing construction or the like or when operating elevating construction machinery such as aerial lift work platforms and the like. The invention further provides a data logging system to record and transmit operational conditions, fault conditions and safety infractions.

17 Claims, 23 Drawing Sheets

Related U.S. Application Data continuation of application No. 13/369,749, filed on Feb. 9, 2012, now Pat. No. 9,245,434.

(60) Provisional application No. 61/440,957, filed on Feb. 9, 2011.

(51) Int. Cl.
*B66F 17/00* (2006.01)
*G08B 21/18* (2006.01)
*G08B 25/08* (2006.01)
*G08B 25/10* (2006.01)

(52) U.S. Cl.
CPC .......... *B66F 17/006* (2013.01); *G08B 21/182* (2013.01); *G08B 25/08* (2013.01); *G08B 25/10* (2013.01)

(58) Field of Classification Search
CPC ........ G08B 21/22; G08B 25/08; G08B 25/10; B66F 11/04; B66F 11/044; B66F 11/046; B66F 17/00; B66F 17/006; A01D 46/20
See application file for complete search history.

(56) References Cited

U.S. PATENT DOCUMENTS

| | | | | |
|---|---|---|---|---|
| RE28,455 | E | 7/1975 | Denier | |
| 3,937,340 | A | 2/1976 | Grove | |
| 4,456,093 | A | 6/1984 | Finley et al. | |
| 4,602,462 | A | 7/1986 | Anderson | |
| 4,660,730 | A | 4/1987 | Holmes | |
| 4,826,474 | A | 5/1989 | Holmes | |
| 4,923,037 | A | 5/1990 | Stephenson et al. | |
| 5,268,591 | A | 12/1993 | Fujimoto | |
| 5,379,468 | A | 1/1995 | Cassidy et al. | |
| 5,549,176 | A | 8/1996 | Hawkins | |
| 5,762,282 | A | 6/1998 | Wolner | |
| 6,147,601 | A | 11/2000 | Sandelman et al. | |
| 6,181,095 | B1 * | 1/2001 | Telmet | G05B 9/02 318/266 |
| 6,265,983 | B1 * | 7/2001 | Baillargeon | B66F 11/044 340/687 |
| 6,272,413 | B1 | 8/2001 | Takahashi et al. | |
| 6,297,744 | B1 | 10/2001 | Baillargeon et al. | |
| 6,310,542 | B1 | 10/2001 | Gehlot | |
| 6,330,931 | B1 * | 12/2001 | Baillargeon | A62B 35/0068 182/2.1 |
| 6,679,284 | B1 | 1/2004 | Raymond | |
| 6,894,621 | B2 | 5/2005 | Shaw | |
| 6,927,694 | B1 | 8/2005 | Smith et al. | |
| 7,182,174 | B2 | 2/2007 | Parrini et al. | |
| 7,275,710 | B2 * | 10/2007 | VanDruff | B64D 25/06 244/129.1 |
| 7,353,817 | B2 | 4/2008 | Kobel | |
| 7,462,138 | B2 | 12/2008 | Shetty et al. | |
| 8,027,349 | B2 | 9/2011 | Brown et al. | |
| 8,205,718 | B2 | 6/2012 | Taylor | |
| 8,224,518 | B2 | 7/2012 | Cameron | |
| 8,239,125 | B2 | 8/2012 | Petrie et al. | |
| 8,325,053 | B2 * | 12/2012 | Flynt | A62B 35/0025 182/4 |
| 8,482,401 | B2 * | 7/2013 | Morino | A62B 35/0025 340/532 |
| 8,490,746 | B2 | 7/2013 | Cummings | |
| 8,514,058 | B2 | 8/2013 | Cameron | |
| 8,550,211 | B2 * | 10/2013 | Higgins | B66F 11/044 182/2.4 |
| 8,596,416 | B2 * | 12/2013 | Crew | E06C 7/12 182/103 |
| 8,881,686 | B2 * | 11/2014 | So | A01K 15/021 119/720 |
| 8,887,865 | B2 * | 11/2014 | Matharu | E06C 7/186 182/8 |
| 8,907,775 | B2 * | 12/2014 | Tyler | B67D 7/348 701/123 |
| 9,245,434 | B2 | 1/2016 | Baillargeon et al. | |
| 9,334,145 | B2 | 5/2016 | Fagan et al. | |
| 10,138,102 | B2 * | 11/2018 | Baillargeon | B66F 17/006 |
| 11,969,612 | B2 * | 4/2024 | Kennedy | A62B 35/0075 |
| 2001/0015691 | A1 | 8/2001 | Mellen et al. | |
| 2001/0030081 | A1 | 10/2001 | Morimoto et al. | |
| 2001/0045220 | A1 | 11/2001 | Fara | |
| 2002/0144862 | A1 | 10/2002 | Engvall et al. | |
| 2003/0173151 | A1 | 9/2003 | Bodtke et al. | |
| 2003/0174064 | A1 | 9/2003 | Igarashi et al. | |
| 2003/0221916 | A1 | 12/2003 | Dube et al. | |
| 2004/0035636 | A1 | 2/2004 | Julien | |
| 2007/0080021 | A1 | 4/2007 | Collins | |
| 2007/0258395 | A1 * | 11/2007 | Jollota | H04W 72/23 455/67.11 |
| 2007/0276619 | A1 | 11/2007 | Sugahara et al. | |
| 2008/0155064 | A1 | 6/2008 | Kosuge et al. | |
| 2008/0204274 | A1 | 8/2008 | Peters | |
| 2009/0145871 | A1 | 6/2009 | Bond | |
| 2009/0249712 | A1 * | 10/2009 | Brickell | A62B 1/10 182/8 |
| 2009/0289781 | A1 | 11/2009 | Yamada et al. | |
| 2010/0039269 | A1 * | 2/2010 | Newham | A61B 5/6887 340/573.4 |
| 2010/0130108 | A1 | 5/2010 | Mann | |
| 2010/0231402 | A1 * | 9/2010 | Flynt | G08B 19/00 340/679 |
| 2011/0103558 | A1 * | 5/2011 | Hooten | A62B 35/04 379/37 |
| 2011/0279276 | A1 * | 11/2011 | Newham | A61B 5/6892 340/573.4 |
| 2012/0211301 | A1 | 8/2012 | Clark et al. | |
| 2012/0217091 | A1 * | 8/2012 | Baillargeon | G08B 21/02 182/18 |
| 2013/0103271 | A1 | 4/2013 | Best et al. | |
| 2013/0118839 | A1 | 5/2013 | Penn et al. | |
| 2013/0153333 | A1 | 6/2013 | Richards | |
| 2013/0206429 | A1 | 8/2013 | Sullivan | |
| 2013/0220734 | A1 | 8/2013 | Guglielmo | |
| 2013/0223958 | A1 | 8/2013 | Cummings | |
| 2013/0240300 | A1 | 9/2013 | Fagan et al. | |
| 2013/0292203 | A1 | 11/2013 | Cummings | |
| 2014/0108599 | A1 | 4/2014 | Borzycki et al. | |
| 2014/0306814 | A1 | 10/2014 | Ricci | |
| 2015/0217981 | A1 * | 8/2015 | Baillargeon | B66F 17/006 182/2.8 |

FOREIGN PATENT DOCUMENTS

| | | | |
|---|---|---|---|
| JP | 2006327722 | A | 12/2006 |
| JP | 4801374 | B2 | 10/2011 |
| WO | 2012109444 | A2 | 8/2012 |

OTHER PUBLICATIONS

Final Office Action for U.S. Appl. No. 14/338,289 dated May 18, 2016; 23 pps.
Final Office Action for U.S. Appl. No. 14/338,289 dated Nov. 20, 2017; 17 pps.
Final Office Action for U.S. Appl. No. 14/608,341 dated Apr. 18, 2018; 12 pps.
Final Office Action for U.S. Appl. No. 14/608,341 dated Feb. 16, 2017; 11 pps.
Final Office Action for U.S. Appl. No. 14/972,788 dated Jan. 14, 2020; 35 pps.
International Search Report for European Application No. 12745217 dated Nov. 2, 2017; 15 pps.
International Search Report and Written Opinion for International Patent Application No. WO2015013333 dated Nov. 24, 2014.
International Search Report for International Patent Application No. PCT/US2012/24481 dated Dec. 3, 2012; 3 pps.
Non-Final Office Action for U.S. Appl. No. 14/972,788 dated Aug. 11, 2017; 24 pps.

(56) References Cited

OTHER PUBLICATIONS

Non-Final Office Action for U.S. Appl. No. 14/972,788 dated Mar. 14, 2019; 38 pps.
Notice of Allowance for U.S. Appl. No. 13/369,749 dated Sep. 18, 2015; 8 pps.
Notice of Allowance for U.S. Appl. No. 14/338,289 dated Jul. 13, 2018; 9 pps.
Notice of Allowance for U.S. Appl. No. 14/972,788 dated Jun. 23, 2020; 38 pps.
Notice of Allowance for U.S. Appl. No. 14/972,788 dated Nov. 7, 2018; 17 pps.
Office Action for U.S. Appl. No. 13/369,749 dated Dec. 5, 2013; 14 pps.
Office Action for U.S. Appl. No. 13/369,749 dated Jan. 29, 2015; 24 pps.
Office Action for U.S. Appl. No. 14/338,289 dated Apr. 3, 2017; 16 pps.
Office Action for U.S. Appl. No. 14/338,289 dated Sep. 24, 2015; 11 pps.
Office Action for U.S. Appl. No. 14/608,341 dated Jul. 24, 2017; 11 pps.
Office Action for U.S. Appl. No. 14/608,341 dated Oct. 29, 2018; 16 pps.
Office Action for U.S. Appl. No. 14/608,341 dated Sep. 6, 2016; 12 pps.
Office Action for Canadian Application No. 2826931 dated Nov. 22, 2017 pps.
Supplementary European Search Report for European Patent Application No. EP12745217 dated Oct. 17, 2017.
Supplementary Partial European Search Report for European Patent Application No. EP14829721 dated Mar. 8, 2017.

* cited by examiner 193
187
201

161
163
187
157
193
201

193
161
187

193
201
187

WARNING AND MESSAGE DELIVERY AND LOGGING SYSTEM UTILIZABLE IN THE MONITORING OF FALL ARRESTING AND PREVENTION DEVICES AND METHOD OF SAME

CROSS REFERENCE TO RELATED APPLICATIONS

This application is a continuation of U.S. patent application Ser. No. 14/972,788, filed Dec. 17, 2017, which application is a continuation of U.S. patent application Ser. No. 13/369,749, now Issued U.S. Pat. No. 9,245,434, issued Jan. 26, 2016 and claims the benefit of U.S. Provisional Application No. 61/440,957 filed Feb. 9, 2011 and entitled Warning and Message Delivery and Logging System Utilizable in the Monitoring of Fall Arresting and Prevention Devices and Method of Same, which are hereby incorporated herein by reference in their entireties.

FIELD OF THE INVENTION

This disclosed invention relates generally to an active interface monitoring and warning system for fall arresting/prevention devices and is more specifically directed to delivering specific fault condition messages to individuals who are subject to accidental falls or other safety hazards when performing construction or the like or when operating elevating construction machinery such as aerial lift work platforms, bucket trucks and similar type elevating work platforms. The invention further provides a data logging system to record and transmit and alert operators, supervisors and emergency personal of fault conditions and safety infractions, as well as transmit data for safety and regulatory compliance as well as schematic or equipment diagnostic analysis information, track and maintain field inventory, increase productivity and improve efficiencies.

BACKGROUND OF THE INVENTION

Remote monitoring devices have been developed to deliver warning messages and critical information to remote locations. For example, U.S. Pat. No. 6,147,601 to Sandelman et al. describes the delivery of messages from remote equipment for periodic preventative maintenance and for catastrophic failure of HVAC equipment. Quite different from HVAC equipment, construction and aerial lift machinery apparatus presents a significant risk and danger not only to the operators, but to those in proximity to the machinery. To address these issues, safety devices such as lanyards or safety harness detection sensors, motion and high voltage proximity sensors and other warning devices to protect the operator have been developed.

U.S. Pat. No. 6,265,983 to Baillargeon discloses a machinery operator protection system and method, which inhibits the use of machinery unless the operator of the machinery is properly secured with a lanyard and/or body harness to the machinery. Optionally, the method may also include an audible or visual warning alarm to the machinery operator if an attempt is made to use the machinery without proper safety lanyard attachment.

U.S. Pat. No. 6,330,931 to Baillargeon et al. describes a safety lanyard detection sensor and warning device which inhibits operation of the machinery and also can deliver a visual or audible message to the operator that machinery movement is inhibited because of failure to secure the operator with a safety lanyard. In U.S. Pat. No. 6,297,744, also to Baillargeon et al., a warning device delivers messages to the operator to secure their safety lanyard at an initial upward movement of the work platform and delivers messages within the area below the boom and work platform or zone of danger that the boom is moving, expressing that persons below the boom should remain out of the area as the boom descends.

In both Baillargeon U.S. Pat. Nos. 6,330,931 and 6,265,983, the lanyard detection sensor disclosed is located on the lift anchor point and upward movement of the work platform is inhibited via an interlock switch unless the lift operator has attached a safety lanyard to the lift anchor point. An issue in this approach is that the system may be defeated by leaving the safety lanyard attached to the anchor point at all times. An operator may forget or otherwise fail to secure the lanyard to themselves, and can even leave the work platform and, in such a situation, leave the lanyard on the anchor point allowing operation of the platform without a secure attachment of the lanyard to the body harness of the operator creating a safety hazard. In these real life scenarios, the unprotected lift operators will be able to go up in the work platform without proper utilization of their fall protection apparatus because the interlock sensor has detected the attachment of the lanyard to the anchor point enabling lift movement without the safety lanyard being attached to the harness worn by the lift operator.

The references disclose delivering verbal messages when the lift is descending, warning others below the lift, or when the operator selects upward movement of the lift and the safety lanyard is not attached to the anchor point, the lift will not be operational until the lanyard is attached to the anchor point, but there is no restriction on operation if the lanyard is not attached to the body harness. The references apply strategies to detect a connection of the safety lanyard to the harness and then to the anchor point, but these designs are not readily available to retrofit current lanyard product and therefore present cost prohibitive barriers to adoption of these methods even though benefits in fall prevention may be achieved.

Importantly, this approach of issuing a verbal message only when a fault has occurred may induce the attachment of the safety harness to the anchor point in order to operate the lift, but does not ensure that the lift operator also verifies attachment of the lanyard to their body harness. The limited verbal message may induce action but fails to reinforce this important safety requirement with a fail-safe system and mechanisms as well as through operational monitoring and with a large number of operators working in remote areas or in areas where there is limited or no supervision, there is no disclosure in the references of a way to reinforce and monitor safety procedures, to track safety violations or to subject violators to penalties, fines and other negative ramifications by Supervisory and/or Safety officials at their workplace or by U.S. Occupational Safety and Health Administration (OSHA) and other regulatory agencies charged with enforcement of work platform fall protection safety infractions. This inability to supervise, track and verify adherence to safety protocols may permit operators to bypass and circumvent safety apparatus without acknowledging or understanding that the apparatus has been put into place to prevent accidents that may result in loss of life.

With the widespread use of aerial lift systems, and the critical need for improved methods of training, the references fail to disclose a system which provides audible and/or visual warnings and reinforces safety procedures and training. The references also fail to disclose the monitoring, tracking and analysis of multiple fault conditions. This analysis may be used forensically to evaluate and determine the events that led to an accident, or establish the failure of an operator to adhere to safety protocols and thereby provide an opportunity for training or punishment, and further demonstrate the adherence of an entity to safety procedures and protocols, data that may be used to support the entity before a government agency. The references also do not disclose a monitoring unit capable of monitoring numerous warning devices and sensors cooperatively to provide continual status checks of safety equipment and deliver as necessary appropriate audible and/or visual warnings based on alerts received from this safety equipment. The safety data handling and information flow to the operator is critical where many operators of aerial lift booms and the like make many trips up and down in the aerial lift work platform while servicing telephone poles, cable TV, power lines hardware, or maintain restocking and inventory from warehouse shelving in retail stores and the like. These scenarios are fraught with situations in which the operator may leave the aerial lift basket or platform area to retrieve tools or the like, return to the aerial lift work platform, and forget to attach the safety lanyard to the anchor point on the boom or work platform or to his/her body harness. The operator may also fail to identify the proximity of high voltage lines as the work platform is angled and shifted to more easily access the wires and equipment being serviced. The various accident situations which can occur are quite dangerous and can include the operator subsequently falling from an aerial lift work platform or being electrocuted from power lines. These accidents tend to be quite severe, resulting in broken bones, head and back injuries, as well as documented cases of permanent paralysis and death.

As a result, the U.S. Occupational Safety and Health Administration (OSHA) has promulgated rules mandating fall protection standards in the workplace. These standards generally mandate that a safety belt be of a length wherein the worker is not able to move enough within the work platform or basket to fall from the platform and therefore is referred to as a fall restraint system. Other standards provide for a lengthened safety lanyard that provides the operator with additional mobility to perform required tasks however this additional slack may be enough to allow the operator to fall and possibly be held hanging by the lanyard and therefore is referred to as a fall arrest system. While these standards generally require the use of fall protection and warning systems and methods in conjunction with the use and operation of aerial lift booms and the like, they do not dictate any positive system of enforcement regarding the use of these fall protection and warning systems nor do any systems exist to properly capture and track infractions by operators failing to secure a safety belt or properly use and react to other safety equipment.

The alternative to the use of positive enforcement has been the use of human safety monitoring personnel (safety monitors) whose job it is to inspect the workplace and inform workers of potential fall hazards. This approach is obviously only effective in situations where the worker is operating in a group context and would be ineffective for service workers that work alone such as telecommunications technicians, electrical workers, arborists, warehouse workers, painters, light and signal maintenance workers, window washers, or maintenance construction workers for example. The use of written fall protection plans and fall protection training are similarly ineffective in this context. Within the context of aerial lift work platforms and the like (where the potential for serious injury resulting from an accidental fall is the greatest), the policies and procedures of OSHA seem to have the least potential for affecting an acceptable solution to this serious safety problem.

Thus, the existing methodologies do not address the human factor involved in the operation of elevating machinery which can pose potentially deadly falls and other hazards to their operators. In fact, government regulations and safety training are insufficient to ensure that safety devices are properly used or in fact used at all. Unfortunately, with the rapid expansion of the construction, telecommunications, and cable TV industries, the use of aerial lift work platform devices has skyrocketed, resulting in a marked increase in accidental falls and subsequent severe injuries to workers in these fields. It is obvious from the record that fall protection training as well as policies and procedures for fall protection are inadequate to solve this problem alone.

While the use of lanyards and other fall prevention devices is widespread within the construction industry, there appears to be no art relevant to systems and methods that permit the use of these devices to be mandated or monitored to ensure their proper use. As a result, accidental falls continue to injure and disable thousands of workers per year.

Accordingly, what is needed is a system and method of reinforcing the safe and efficient use of aerial lift work platform safety devices and the like, and which does not interfere with mechanical operation of the machinery, so that the operator of such a device is properly secured to the aerial lift work platform with a body harness and attached lanyard and the work platform or basket door is properly secured. The operator must also be properly aware of fault conditions in safety equipment such as warnings issued from proximity monitors that high voltage wires are within the work vicinity or that wind speed is excessive creating a dangerous condition. Other similarly ineffective in this context. Within the context of aerial lift work platforms and the like (where the potential for serious injury resulting from an accidental fall is the greatest), the policies and procedures of OSHA seem to have the least potential for affecting an acceptable solution to this serious safety problem.

In addition to tracking and reinforcing safety procedures and protocols, a monitoring and data transmission system could increase productivity, lower costs and improve efficiencies. Access to schematic information, previous repair reports, availability of inventory and other information could allow an operator at a remote location such as in servicing a downed power line to better determine efficient strategies for repair and/or photograph the location and transmit this data for further analysis and suggestions by supervisors. Further, the system may be integrated with a video monitor to monitor and document work.

A monitoring and data transmission system could effectively accept and record data from of all safety devices and provide proper procedural steps needed to assist the operator to properly react to a variety of fault conditions and/or provide additional information to evaluate field conditions and equipment repair. Such a system should minimize the operational impact on the use of existing lanyard devices and other safety equipment by not requiring the operator/worker to perform extra safety related functions to affect mandatory use and understanding of the equipment. Such a system should also provide warnings and instruction to the operator when a lanyard device is not secured or another fault condition exists, while normally not interfering in operation of the machinery and equipment, unless entirely necessary. Such a system should further track and log safety data including misuse and infractions where an operator bypasses or delays in the use or reaction to a safety warning thereby notifying training personnel and others of the lack of adherence by their operators to safety regulations. A further important feature is that such a system be able to integrate and adapt with existing systems to remove barriers that may prevent adoption of an improved safety system within the aerial lift work platform field.

SUMMARY OF THE INVENTION

According to the teachings of the present invention, a machinery operator protection and data logging and transmission system and method is described which allows access to data, reinforces the use of safety systems, monitors and tracks both proper and improper lift operator performance including the misuse and infractions by the operator in using the machinery without properly performing safety procedures such as securing a lanyard and/or body harness to the machinery, and/or adhering to fault condition warnings is provided.

The disclosed system generally includes a warning system interface that continually monitors lift operations including the monitoring of safety equipment conditions. During operation of the aerial lift apparatus the system may provide reinforcing commands and warnings to an operator based on mechanical and environmental conditions. The commands and warning may use verbal and audible messages to instruct the operator on proper safety procedures for general operation of the lift and specific fault conditions. The warning system interface will further monitor and log general operation of the lift with, date, time and telematics information to track for example the amount of time the operator spends attached to and working and ascending or descending in the lift. Data that may be used to determine efficiency and work performance of operators as well as timing and scope of proper lift maintenance.

The commands and warnings may both monitor and instruct an operator in safe operation such as by reminding an operator of proper safety procedures and logging both adherence to those procedures or fault where the system has detected improper adherence to a procedure. For example, the interface monitoring unit may first remind the operator of the requirement to attach a safety lanyard connection. The system may also monitor a lanyard connection detector for detecting proper attachment of at least one lanyard to the operator and log both proper attachment and a detection fault. The system may further provide repeated verbal warnings to remind the operator that a safety lanyard is not attached, the warning system halting the warnings when the connection detector indicates that the lanyard is properly attached. The fault condition would be logged in a data logging system, such as a lanyard not being properly attached and the time or number of infractions in use or amount of delay in use of the safety system by the operator.

The system would further record the time, date and number of times the safety lanyard was attached and detached from the system and the time, date and number of times the lift was operated in an upward and/or downward movement. This collection of data may then be evaluated and cross-checked to determine if the attachment and detachment of the safety lanyard coincides with the operation of the lift. For example, if the lift is operated up and down five times over a two day time period, but the safety lanyard has been detected as attached once, then this data may indicate safety lanyard detection device has been circumvented in some manner, thereby providing an opportunity to reinforce training and/or mete out penalties to a repeatedly offending operator.

In monitoring safety equipment, the interface would detect fault conditions and determine appropriate responses to the fault. For example, the interface may translate a fault condition of a wind gust of over 40 mph from a wind speed indicator and issue a verbal message to the operator, "Descend immediately! Warning high wind conditions!" The interface response may be an audible alarm, a verbal command/or the activation of a timed or un-timed interlock that prevents further movement or performs controlled movement of the aerial lift work platform. For example, in response to a fault condition from a proximity warning system detecting that the aerial lift boom/bucket is in an area of danger of high voltage wires, the interface may incorporate a latching relay control system that halts the upward motion of the aerial lift boom/bucket. The interface may also issue audible alarms and messages to the operator such as "Watch your overhead clearance! Warning high voltage! Descend immediately!" In further examples, the interface may issue warnings of an overload of weight within the aerial lift boom/bucket, or issue an instruction to latch the door of the aerial lift boom/bucket if a fault is detected, or instruct the operator that the position of the truck is on a steep or unstable gradient from detection of a fault of a stability warning device. Frequently, a material handling overload may occur from the lifting by the operator of a large weight such as a tree limb that exceeds the specifications and recommendations for use of the aerial lift platform or basket. The detection of a material handling overload may be transmitted from a material handling jib boom or cross arm. This can result in stress fractures and other latent damage to the boom and support assemblies for the basket. While a single infraction may not result in an accident, repeated infractions may overtax the limits of the support structure and result in a tipping over of the truck due to the excessive weight and/or a sheering of boom or support and the basket, either condition resulting in serious harm to the operator and damage to the equipment. An important feature of the monitoring unit, as described in further detail below, is an interface with a load sensor and the issuance of a verbal warning to the operator when the specified load of the aerial lift platform/bucket has been exceeded. Additionally, a reading of the measured load and a logging of the infraction and number of previous infractions may be provided to reinforce and deter continued violations that may result in equipment failure. The interface may further detect if the weight within the aerial lift platform/bucket abruptly changes while the bucket is in a raised position, thereby indicating that the operator may no longer be in the bucket and a load sensor and a sensor positioned on the anchor point, as described in further detail below, may detect if an operator has fallen to the ground or is hanging by the safety lanyard from the bucket. An operator hanging from the bucket in the body harness may experience permanent nerve damage and loss of circulation to the extremities in as little as twenty minutes. The immediacy of assistance to the operator is critical. This event may trigger a response by the monitoring system to immediately contact emergency personal and provide a warning of possible injury to the operator including information such as map coordinates, identification and other information by interfacing the system with a telematics and/or global positioning system (GPS) as described in further detail below.

It is an object of the present invention to integrate a safety warning device to a new or existing aerial lift work platform system to monitor one or more safety devices and to issue verbal messages and warnings to the aerial lift operator upon entering the aerial lift work platform, and/or at the beginning of any motion of the aerial lift apparatus, and/or whenever any dangerous condition becomes evident triggering a response from the monitoring unit.

It is another object of the present invention to isolate the power source of an interface warning and data recovery/transmission system to provide a high degree of isolation of the operator and work platform from electrical systems external to the platform to reduce the risk of electrical shock to the operator.

It is another object of the present invention to monitor and detect the secure connection of a safety lanyard to a machinery operator of the aerial lift work platform and to issue repeated verbal messages and warnings to attach his/her safety lanyard so that he/she is secured to the aerial lift work platform, the repeated warnings may stop when the secure connection of a safety lanyard to a machinery operator is detected, or alternatively the operation of the work platform may be halted until the secure connection is detected.

It is another object of the present invention to monitor and detect the secure latching of the door of the aerial lift work platform and to issue repeated verbal messages and warnings to secure the door of the aerial lift work platform; the repeated warnings may stop when the secure connection of the door is detected.

It is an object of the present invention to monitor one or more safety devices to detect fault conditions and to translate the fault condition to an audible verbal or visual warning to the aerial lift operator to instruct the operator of the proper safety procedure to undertake based on the fault condition.

It is another object of the present invention that the monitoring system provide access to internal and external data through an intranet and/or internet connection to assist the operator of the lift in access to engineering and fault diagnostic data, access to inventory and material data and control of data through the use of a bar code scanner or other material tracking device interfaced with the monitoring system, and access to telematic and status data for current conditions at the present location or other locations.

It is yet another object of the present invention that a timer begins at the time a first audible or visual warning is detected and that each subsequent warning issued is recorded as a delay and/or infraction by the operator in adhering to safety procedure. Additionally, one or more cameras attached to the boom and/or basket may capture pictures or video of the operator, control systems, work area and work in progress while the boom is in operation. Live video and audio may assist in an emergency to determine the extent of an operator's injuries and may provide vital forensic information after an accident or corroborate the adherence of an operator to appropriate safety procedures.

A further object of the present invention is to record and transmit telematics data associated with an infraction in the use of safety equipment such as; the vehicle identification, the work platform identification, the operator, the date, the time, the location, the infraction and amount of delay etc., the transmitted and received data to be conveyed through different media, including a system computer, hardware connected to a server, a cell phone, a PDA, iPhone, iPod, iPad the internet, etc. The data transmitted may further include a video monitor to monitor and document work.

A still further object of the present invention is to relate the infraction data associated with a particular operator or vehicle and lift device and compile the data for safety compliance reporting and training.

The present invention is directed to a safety protection system for aerial lift apparatus comprising a personnel support platform for supporting and moving personnel to a desired work location; an interface monitoring unit mounted to the personnel support platform for receiving and transmitting data; a plurality of equipment condition detectors located on the personnel support platform of the aerial lift apparatus and communicating with the interface monitoring unit; a data server for at least one of receiving, storing and transmitting data and commands in communicating with the interface monitoring unit; and wherein the data server is provided with at least one information logging database and data received by the data server from the interface monitoring unit on the personnel support platform is input to the database and organized according to predetermined categories.

The present invention is further directed to a method of integrating a safety protection system into an aerial lift apparatus with safety condition detectors and a data server comprising the steps of providing a personnel support platform for supporting and moving personnel to a desired work location; attaching an interface monitoring unit to the personnel support platform for receiving and transmitting data; locating a plurality of equipment condition detectors on the personnel support platform of the aerial lift apparatus to communicate with the interface monitoring unit; providing a data server for at least one of receiving, storing and transmitting data and commands and communicating with the interface monitoring unit; and organizing transmitted data from the interface monitoring unit to the data server with at least one information logging database according to predetermined categories.

These aspects of the invention are not meant to be exclusive and other features, aspects, and advantages of the present invention will be readily apparent to those of ordinary skill in the art when read in conjunction with the appended claims and accompanying drawings.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
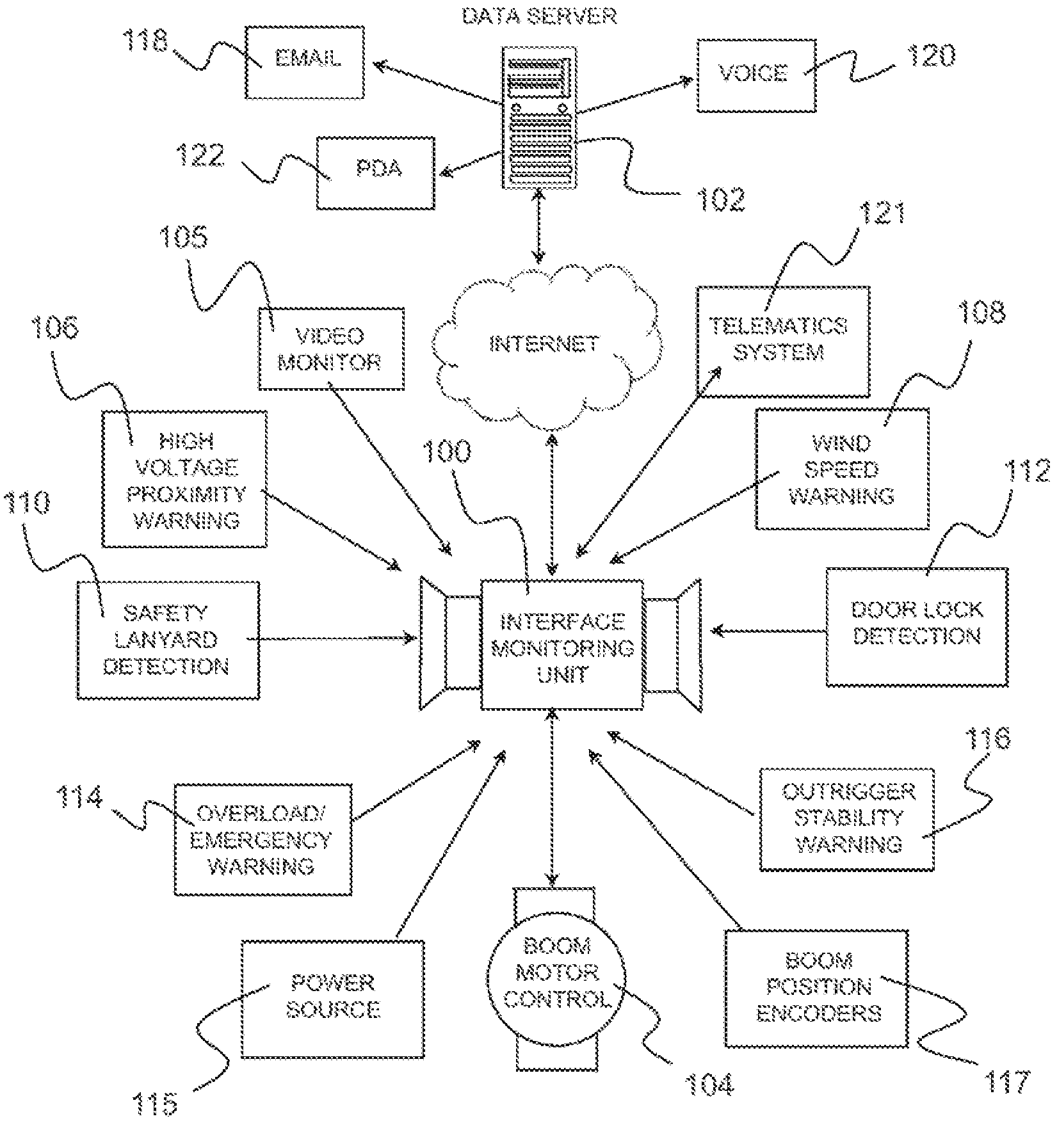
FIG. 1 illustrates a first embodiment of the interface monitoring unit with safety warning devices and a data server.

As shown in FIG. 1, an interface monitoring unit 100 for warning and data recovery and transmission is used in combination with a plurality of safety devices in a fall protection system which provides a single command point for the distribution of alerts and fault condition messages to a machinery operator, and provides instructive reinforcement to create operator compliance of safety regulations and procedures. The interface monitoring unit 100 is shown in communication with several safety warning devices, a data server 102 that provides access to internal and external data through an intranet or internet connection, and optionally an axis point to monitor and control up and down motion of the boom motor 104. A video monitor 105 to monitor and document work may also be in communication with the interface monitoring unit 100.

As an example in a first embodiment the equipment condition detector safety devices may be a high voltage proximity warning 106 that detects high voltage at a distance of approximately 1 Oft from the aerial lift work platform or basket, or an environmental condition detector such as a wind speed indicator that warns of high wind conditions 108, a safety lanyard connection detector 110, a door lock detector 112, and overload or load fault warning that detects excessive weight or an abrupt change in weight on the work platform or basket 114 and an outrigger stability warning 116 that measures the vertical grade of the parking area of the vehicle or aerial lift support machinery and sends an alert if the slope is too steep. The data server 102 may be housed within the vehicle or aerial lift support machinery and may be connected locally to the interface monitoring unit or alternatively it may be a wireless connection to a secure intranet or internet server. The data server 102 in conjunction with the interface monitoring unit 100 may send warning messages and data as alerts to one or more email addresses 118, telephones 120, tablet, iPods, iPads, or PDAs 122. The interface monitoring unit 100 may provide organized and categorized data and metadata to the data server 102 based on signals transmitted to and from the vehicle motion controls and/or the equipment condition detectors. Data transmission from the interface monitoring unit may establish predetermined categories and organizational hierarchy through the use of data fields and metadata to efficiently store and access relational data within one or more of the data server databases 230. The monitoring unit may further interface with a telematics system 121 such as for example a vehicle monitoring system that provides speed and diagnostic information such as tire pressure of the vehicle or other information or a global positioning system (GPS) that provides location of the vehicle in the event of a critical warning and/or provides location information with logged data as described in further detail below.

The interface monitoring unit 100 for monitoring, logging, transmission, storing and receiving of data and other requirements may be provided by the same power source as the AC or DC power supplied by the truck or prime mover via wires up the boom or alternatively from a hydraulic powered generator at the boom end driven by a hydraulic circuit from the truck or prime movers power take off (PTO) circuit. However, to prevent the risk of electrical shock to the operator, insulated aerial lifts do not have wires or conductors in the boom and instead need an isolated and independent battery power source at the boom end and a charging system. In a first embodiment of the invention for insulated lifts, the power source 115 or charging system is a hydraulic power AC/DC generator with electrical/hydraulic regulation to charge the battery and provide power for the system. Using this unique design of the present invention for insulated aerial lifts as discussed in detail below allows the power source 115 to be isolated thereby maintaining the insulated qualities of the aerial lift while providing power to operate the warning and data recovery/transmission system of the interface monitoring unit 100. The interface monitoring unit 100 may also be connected to a boom position encoder 117.

Figure 2:
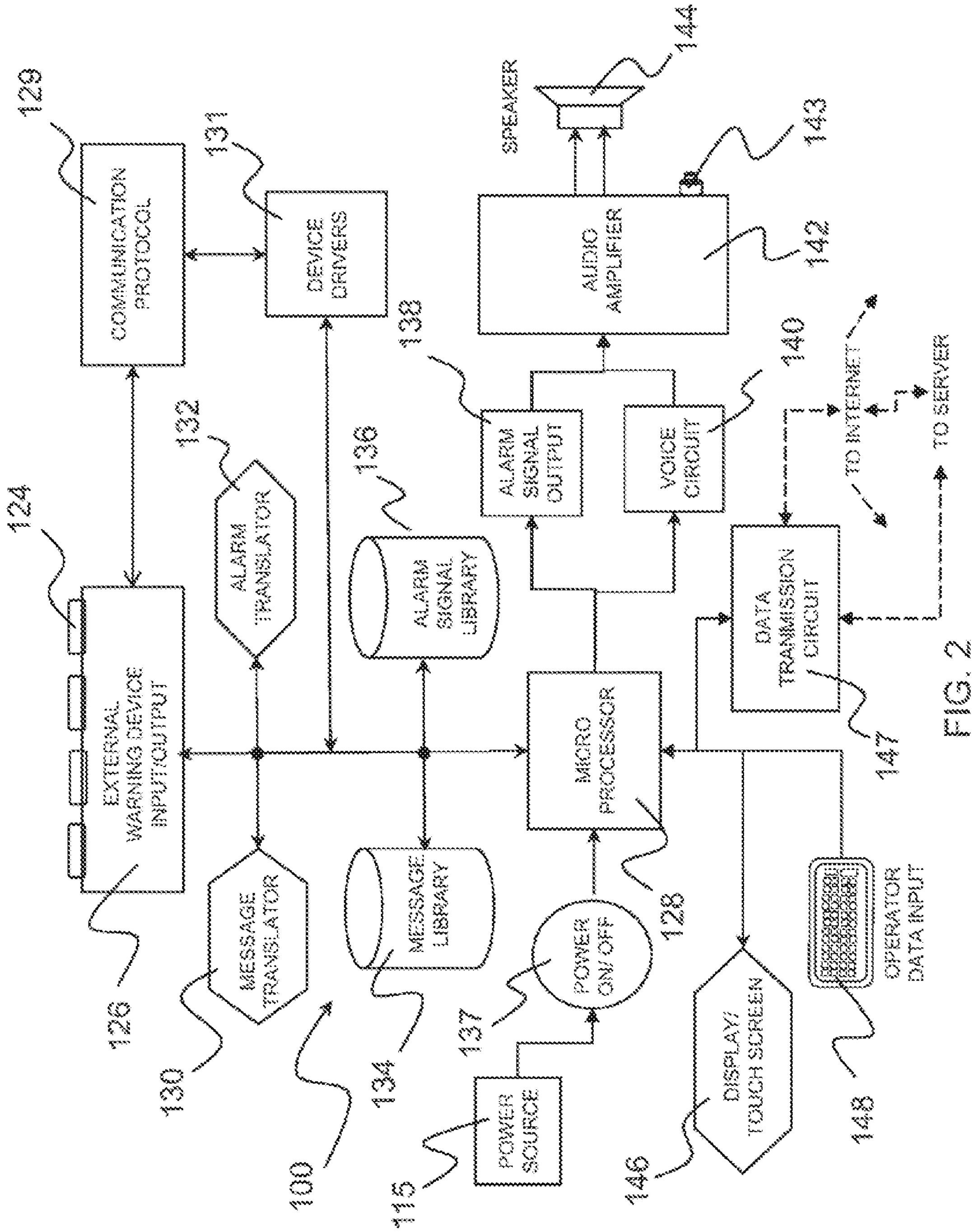
FIG. 2 illustrates a schematic of one embodiment of the interface monitoring unit.

A first embodiment of the components of the interface monitoring unit 100 is shown in FIG. 2. The unit 100 may have a plurality of data ports 124 to connect directly to one or more safety warning devices. The data ports may be USB, serial, parallel or other connector types to accommodate the data output format of the safety warning device. An I/O bus 126 distributes signals from the external devices to a microprocessor 128. When an external safety device is connected either directly through data port 124 or using wireless communication to the interface monitoring unit 100, the communication protocol 129 initially accesses or downloads device drivers 131 or other software protocols to convert and accept communications from the device. Those communications and all subsequent communications are then directed to the microprocessor. An incoming warning or fault condition or signal from the device is interpreted by a message translator 130 and/or alarm translator 132 that reviews a message library 134 and alarm library 136 to forward an appropriate verbal, audible and/or visual communication to the operator. In performing a translation, the interface monitoring unit software may extract warning language and alerts from the external safety device and incorporate these items into the appropriate library, both for immediate and subsequent use. The translated message or alarm may recite specifically the warning provided by the device and may provide additional instructional information and suggested appropriate response actions to be taken by the operator. The message may also be translated into the appropriate language based on a setting on the interface monitoring unit 100 selected by the operator.

A translated message is routed through the microprocessor 128 to the appropriate alarm signal output 138 or voice circuit 140 to the amplifier 142 to be amplified through one or more system speakers 144 and/or through a headphone jack 143 to headphones worn by the operator. In addition to routing and translating the message appropriately, the interface monitoring unit 100 logs the date, time and other information related to the message received. This information that may include the identification of the operator, the location of the truck and the status of the boom encoder that indicates the position of the boom in a raised or lowered position. The information is then transferred to the server or transmitted directly to appropriate supervisory or emergency personal through an appropriate communication protocol to be received by a cell phone, tablet, iPhone, iPod, iPad, or other communication device. As will be discussed in greater detail below the interface monitoring unit 100 provides for data input from an operator or administrator to review and respond to information provided by the unit. In addition to the monitoring of safety and equipment condition detectors, the interface monitoring unit 100 may continually monitor operational conditions of the lift such as the ascending or descending of the lift and the date, time and other information to track efficiencies and work performance of the operator. The unit 100 may have one of an LCD, LED or other display screen 146 with touch screen input or alternatively and/or in addition a keyboard 148 for data entry. Power for the interface monitoring unit 100 may be provided by a PTO circuit from the truck or prime mover or by an isolated battery power source 115 at the boom end and a charging system with power to the unit controlled by a power switch 137.

The aerial lift or crane elevates personnel or material to the work area utilizing telescopic and/or articulated or scissor booms connected to a turret that may rotate 360 degrees on its axis. The booms of these devices may be insulated or non-insulated, depending upon the requirements of the work area. These devices may be equipped with a personnel platform or bucket that is permanently attached or removable. These platforms are equipped with controls and other accessories that may require AC or DC power.

Figure 3:
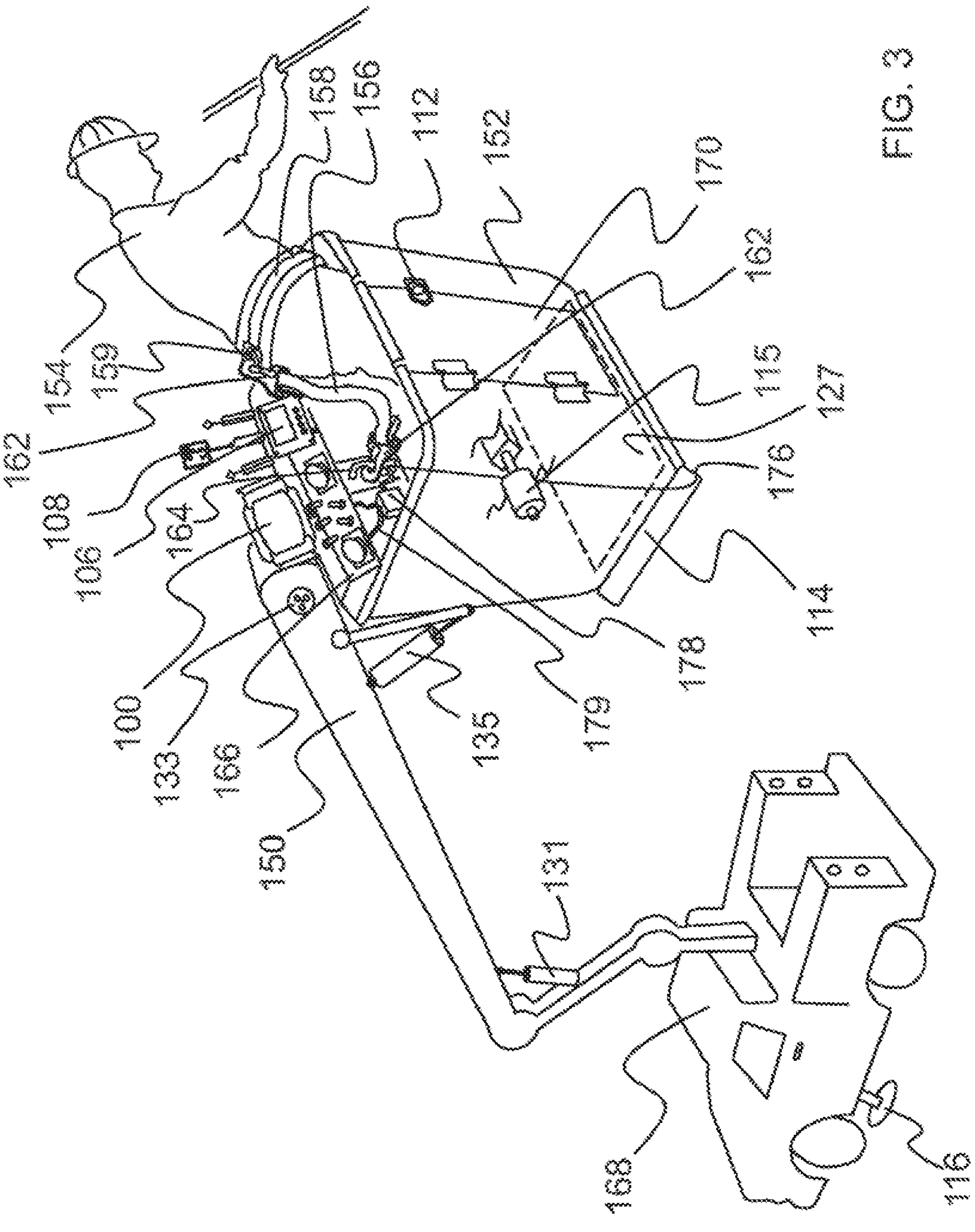
FIG. 3 illustrates an embodiment of a conventional aerial lift work platform with a vehicle and the interface monitoring unit with a number of safety warning devices.

As shown in FIG. 3, a conventional aerial lift boom application has a truck 168 or other support on which an aerial lift boom 150 supports an aerial lift work platform or basket 152 in which an operator 154 works. A control panel 166 has buttons and switches to operate the aerial lift work platform in an upward and downward motion, with safety switches to immediately shut down power as required in an emergency. The aerial lift operator 154 is typically restrained to the aerial lift work platform or basket 152 via a body harness 158 and a safety lanyard 156. The safety lanyard 156 is connected at each end to fasteners such as snap hooks 162 and extends between the body harness 158 and an attachment point, such as a support anchor point 164 on the boom or work platform. As noted above a failure to properly connect the safety lanyard 156 to the support anchor point 164 may result in injury or death if an operator falls out of the basket 152.

The interface monitoring unit 100 may further communicate with an overload sensor 114 and display the load limit and the current load of the platform/basket. If the current load is within a specified range of or exceeds the load limit, a verbal and/or visual warning message may be displayed. As noted above repeated infractions by an operator in lifting or placing loads in the basket that exceed load limits can cause stress fractures that overtime will damage the boom support structure and may result in the tipping over of the truck or shearing of the boom. The overload sensor 114 may be for example a support deck 127 positioned with in the floor of the platform/basket to measure changes in loads within the basket. The support deck may be wired directly to a data port 124 of the interface monitoring unit 100. In further embodiments the overload sensor may be positioned directly along the boom at the lifting cylinder 131, or at the load pin 133 where the basket is connected to the boom, or at the leveling cylinder 135 that provides for an operator to adjust and level the basket to keep the basket in a stable level position with respect to gradient of ground where the vehicle is parked. The interface monitoring unit 100 provides for wireless connection of any of these overload sensors 114 or of other sensors positioned remotely from the platform/basket. A particular advantage in retrofitting sensors to older equipment and/or in the use of insulated baskets used in high voltage power line work where there is a risk of shock if wires are run to and from the internal insulated portion of the basket.

In addition to the detection of a load that exceeds the load specification of the equipment, the overload sensor 114 may further detect an abrupt change in load when the boom is in a raised position indicating the operator may have fallen out of the platform/basket. In this situation where time is critical, the interface monitoring unit 100 may immediately contact emergency personal and provide telematics information on the identity and location of the truck and operator. The telematics data is more specifically vehicle telematics data indicating for example GPS based location information. Vehicle telematics and tracking is a way of monitoring the location, movements, status and behavior of a vehicle or fleet of vehicles. This is achieved through a combination of a GPS (GNSS) receiver and an electronic device (usually comprising a GSM GPRS modem or SMS sender) installed in each vehicle, communicating with the user (dispatching, emergency or co-coordinating unit) and PC- or web-based software. The data are turned into information by management reporting tools in conjunction with a visual display on computerized mapping software.

Figure 4:
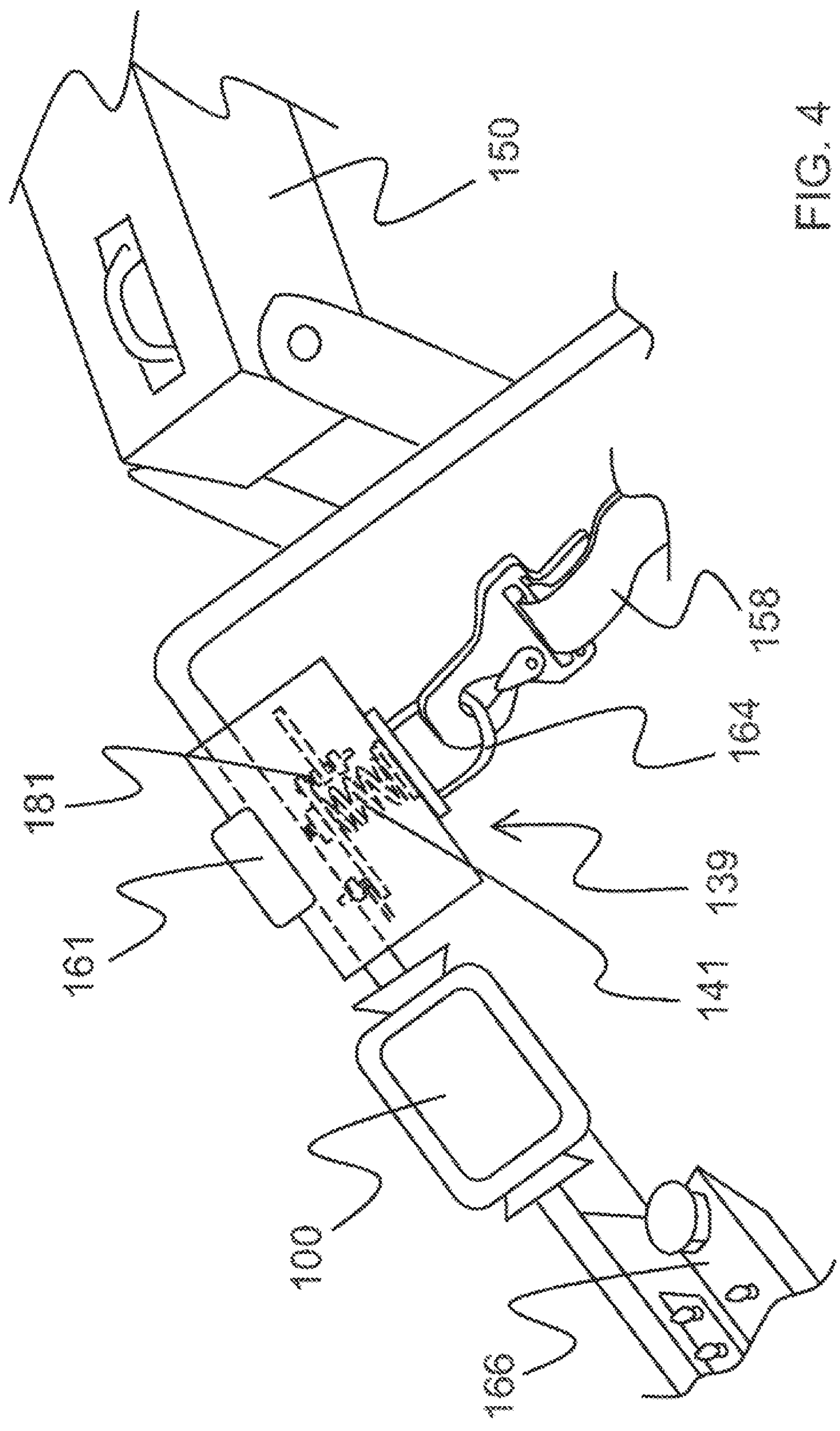
FIG. 4 illustrates an embodiment of a load sensor warning system with the interface monitoring unit.

A further hazard as described above is the operator falling out of the basket and being left hanging from the safety lanyard. To address this, the anchor point 164 may be configured with a load sensor warning system 139 as shown in FIG. 4. In a first embodiment, the system 139 may be simply a strain gage or spring 141 and switch 181 that closes sending a signal when a load pulled in any direction on the anchor point 164 is detected. The signal is transmitted through a wire connection to the input data port 124 of the interface monitoring unit 100, or preferably and as required in the insulated basket systems described above wireless sensors or encoders within the system 139 transmits the signal to the interface monitoring unit 100.

Figure 5A:
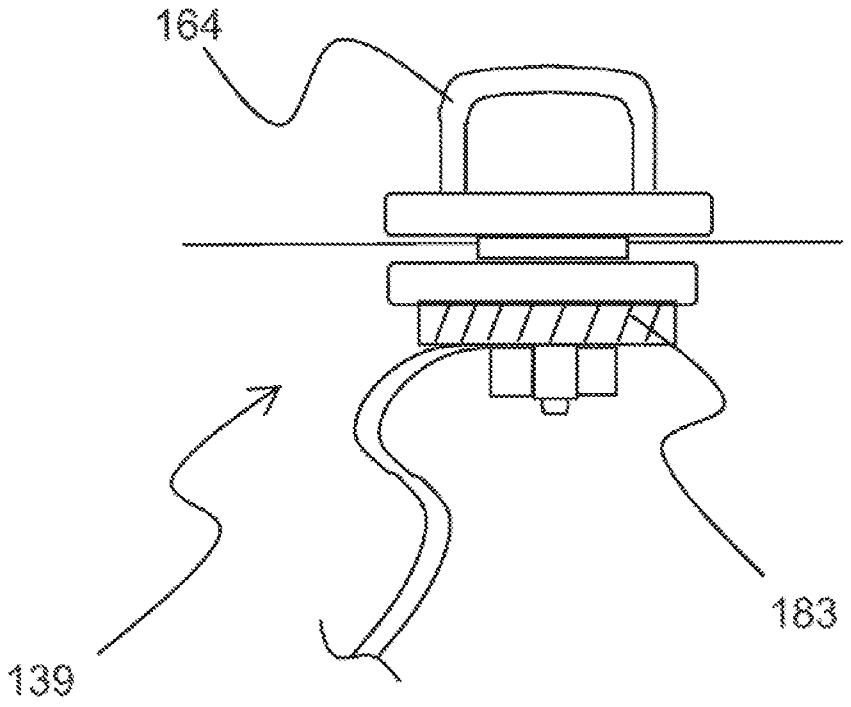
FIG. 5A shows a further embodiment of the load warning system.
Figure 5B:
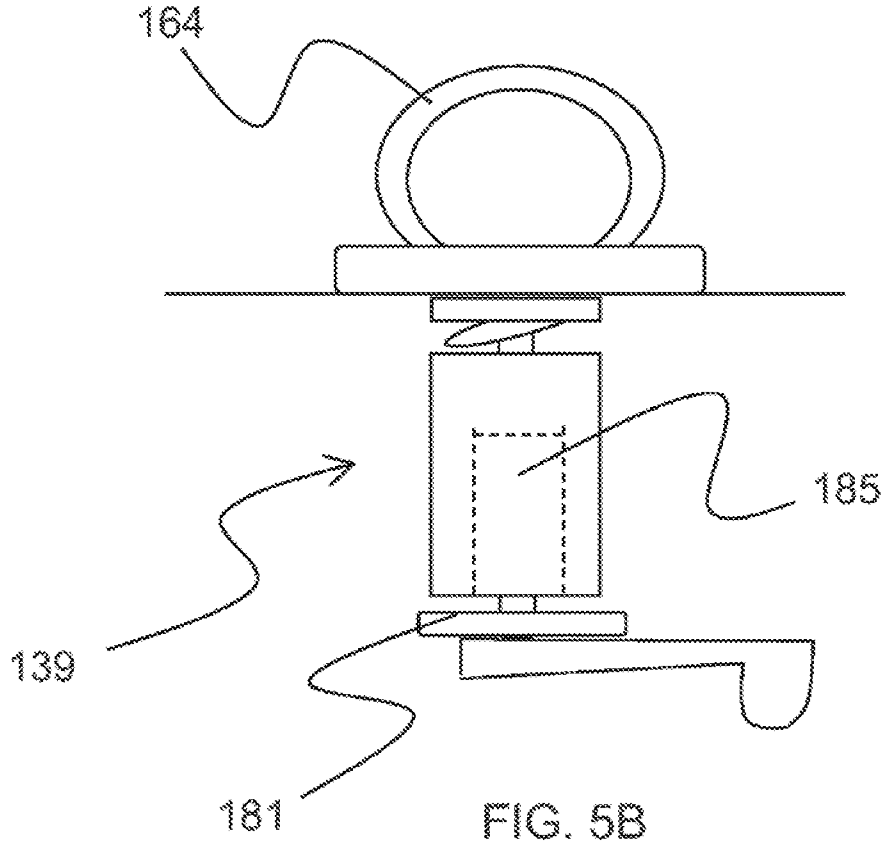
FIG. 5B shows a still further embodiment of the load warning system.

In an accident of this nature where time is critical to assist the operator and prevent or reduce injury, the interface monitoring unit 100 may immediately contact emergency personal and provide telematics information as previously described. The load warning system 139 may be easily retrofitted to an existing anchor point 164 or may replace an existing anchor point 164. The load warning system 139 may be a solid state integrated circuit 183 with an internal switch as shown in FIG. 5A or a hull effect sensor 185 and magnetic switch 181 as shown in FIG. 5B or another load sensor and transmission system that may be selected and configured based on the variety of anchor point designs that may position the anchor point horizontally or vertically and the space requirements within the platform/basket. In any configuration, a transmission of a fault signal to the interface monitoring unit 100 may trigger the notification to appropriate personal and may further open a communication channel from the emergency personal to the operator and/or may provide access of audio and/or video from remote cameras positioned on or around the work platform to access the situation and status of the operator. The interface monitoring unit may further transmit a signal to emergency personal from a motion sensor or "man down" warning system that would signal if non-movement of the operator was detected over a period of time due to a fall or injury.

In an embodiment of the present invention, the safety detection monitoring system 100 may utilize a safety lanyard detection sensor 110 as described in the references of Baillargeon, but also makes novel improvements which further facilitate that the lift operator 154 will indeed be wearing his/her safety harness 158 and will indeed utilize a safety lanyard 156 which is attached properly at both the anchor point 164 and the harness ring 159. This is accomplished by incorporating the automatic logging of the date and time of all of the safety lanyard attachments and safety lanyard detachments made by the lift operator 154. This is further accomplished in this new teaching by also automatically logging all of the UP switch and DOWN switch activations of the lift work platform/bucket 152 made by the lift operator 154. In many instances, the supervisory and safety staffs where the lift operator 154 is employed may not be or cannot be in the location to visually watch over the lift operator 154 to verify proper fall protection practices are always adhered to but these same supervisory and safety staffs will have access to this logged information regarding the lift operator's time and date stamped proper use of safety lanyard attachments and detachments as well as to the time and date stamped logged usage of the up and down movements of the lift work platform.

The lift operator 154 who may have been inclined to circumvent the anchor point lanyard detection sensor 110 described in the Baillargeon references with intent by for example, placing a screwdriver or other object into the anchor point lanyard detection sensor 110 or the lift operators 154 who simply always leave their safety lanyard 156 snapped off to the anchor point lanyard detection sensor 110 on boom or basket but then fail or forget to attach the other end of lanyard 156 to their harness ring 159 would now be subject to Supervisory and Safety Department discipline at their work facility as well as Regulatory discipline from OSHA and other State and Federal Agencies charged with enforcement of fall protection safety Standards and policies designed to save lives and limit injuries from falls. This is accomplished when the logged entries of the individual lift operator's lanyard attachment time and date stamps are reviewed and indicate many hours of "false attachment" proven by the fact that there were no time and date stamped UP and DOWN switch activations made by the lift operator during those minutes/hours and days immediately following the sensing of an anchor point attachment by the anchor point detection sensor 110. The interface monitoring unit 100 may further provide data on adherence to safety procedures by recording the proper attachment and detachment of the safety lanyard during lift operation, data that may be used to support adherence to safety procedures to regulatory agencies.

A safety detection sensor 110 may be sewn or affixed within the safety lanyard 156 or be incorporated to the anchor point 164 and/or the harness ring 159 and optionally be wired directly to the boom control panel switches for up movement. A connection of the lanyard 156 by the operator to the anchor point 164 and/or a connection of the lanyard 156 to the harness ring 159 must be detected by the attachment sensor 110 or an error warning will be sent to the interface monitoring unit 100. The interface monitoring unit 100 will give an audible verbal warning to attach the lanyard 156 and will log an infraction as described in further detail below. The warnings will be repeated and each additional infraction logged until an attachment of the safety lanyard 156 by the detector 110 is received. Safety lanyards and detectors, as described in U.S. Pat. Nos. 6,265,983 and 6,330,931 to Baillargeon and Baillargeon et al. respectfully may be used, and in further embodiments contemplated in this disclosure, the safety warning monitoring unit 100 may communicate with the detection sensor 110 that may be incorporated in the harness 158 and/or safety lanyard 156 using wireless transmission to provide for the operator 154 having the detection sensor and monitor on at all times as described below.

Figure 6:
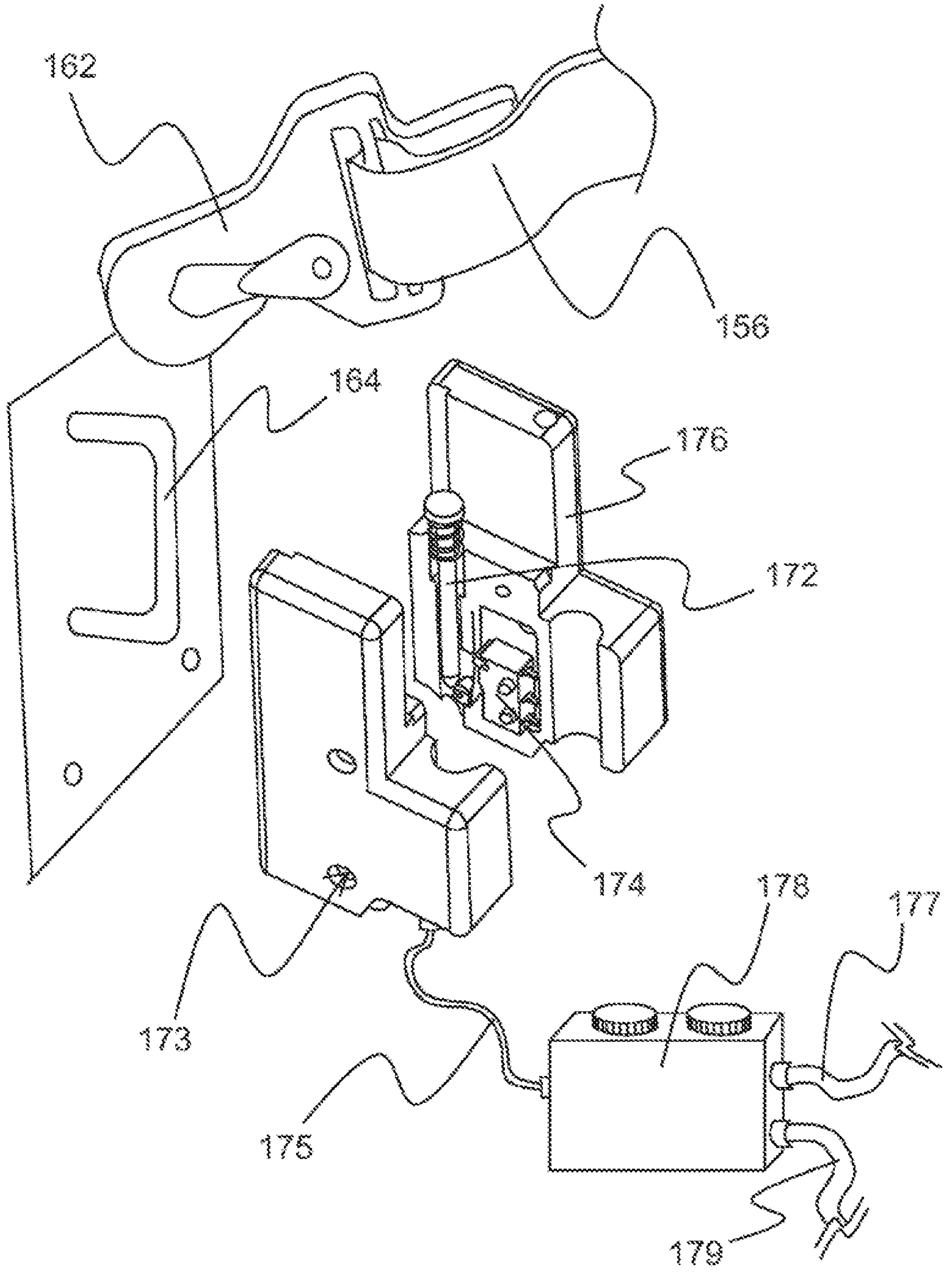
FIG. 6 a first embodiment of a safety lanyard sensor.

In one embodiment, the safety detection sensor 110 may be a removable interlock switch 176 secured around the anchor point 164 and may have a connection 175 to a controller 178. The interlock switch 176 and controller 178 may be integrated with the interface monitoring unit 100 through a connection 177 to the data inputs 124 or through wireless communication thereby providing for the monitoring interface device being adaptable to existing equipment. In one embodiment, the interlock switch block 176 is secured around the anchor point 164 on an existing aerial work platform using screws, bolts or other attachment methods as shown in FIG. 6. A rounded cutout or other shaped area in the block provides space for an anchor point 164 that may be of one or more various shapes and allows the block 176 to be tightly secured around the anchor point 164.

Figure 7:
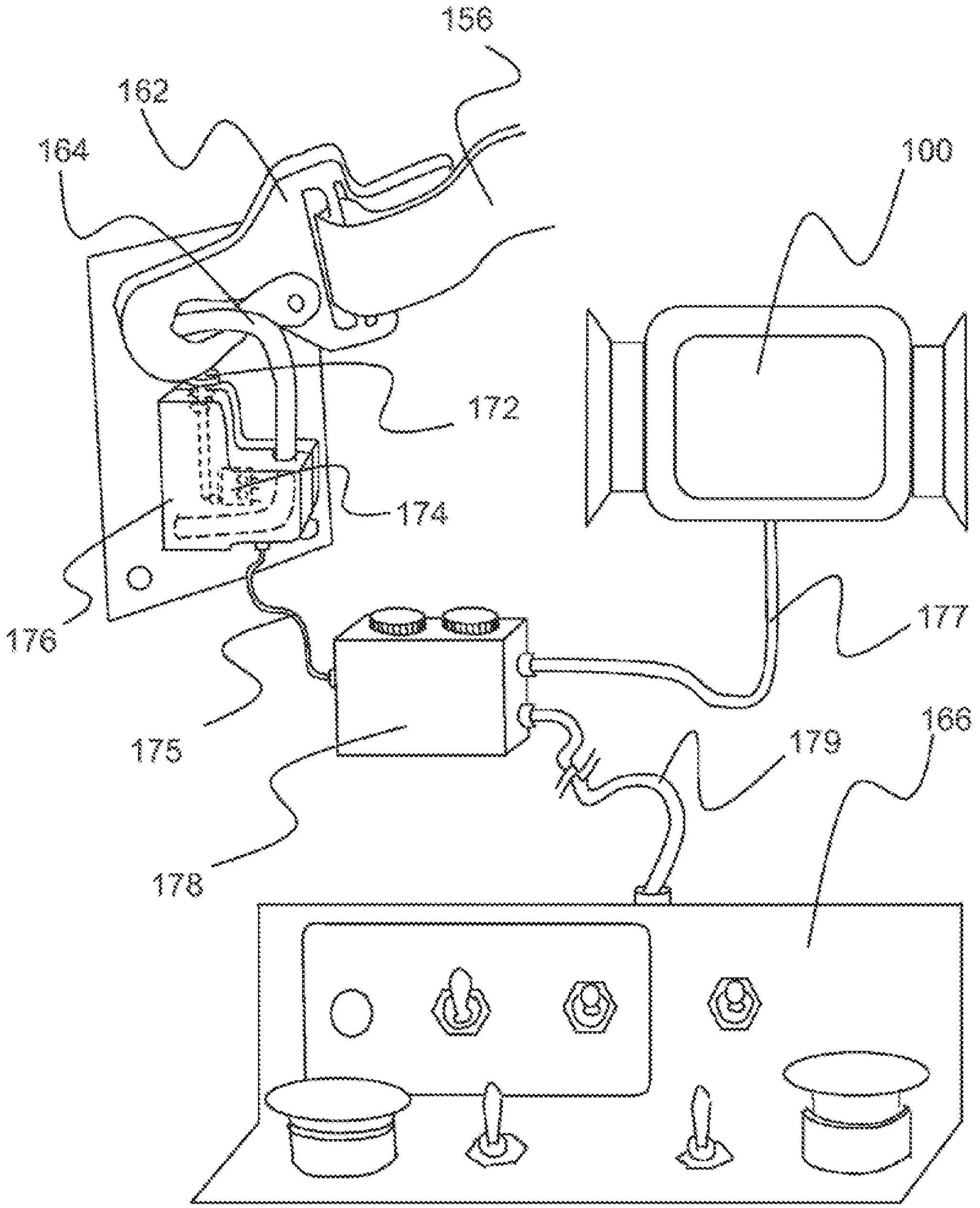
FIG. 7 illustrates the safety lanyard sensor of FIG. 4 integrated with the interface monitoring unit and connected to the control panel.

Once the block 176 is secured as shown in FIG. 7 a spring plunger 172 is aligned below the anchor point 164 providing a base for a snap hook 162 or other attachment feature of a safety lanyard 156 to rest and compress the plunger 172, thereby closing against a detector switch 174. The detector switch 174 sends a signal to the controller 178 that the detector switch 174 is activated indicating the safety lanyard 156 is secured to the anchor point 164. A further transmission is made from the controller 178 to the interface monitoring unit 100 signaling an attachment of the safety lanyard 156 to the anchor point 164. Alternatively, the detector switch 174 may include a transmitter 161 and may transmit a signal directly to the receiver 125 of the interface monitoring unit 100. In addition to the connection 177 to the interface monitoring unit 100, in further embodiments there may be a connection 179 to the control panel 166 as shown in FIG. 7 to prevent activation of the lift unless a secure detection signal of the safety lanyard 156 to the anchor point 164 is received.

The switch block 176 may be in the form of one or more pieces that are secured together around the anchor point 164, or be a hinged piece that opens and then closes around the anchor point where it is secured. A variety of activation switches 172 and detectors 174 within the switch block 176 for signaling a connection of the safety lanyard 156 to the anchor point 164 are also contemplated. A similar interlock switch block 176 may be shaped to mate with the shape of the harness ring 159 providing a similar plunger 172 or other type detector switch 174 to signal a connection of the safety lanyard 156 to the harness 158, thereby defeating a common safety issue, where the operator hooks the lanyard 156 only to the anchor point 164 and leaves the other end hanging within the work platform/bucket unattached.

A secure detected connection of the safety lanyard 156 to the anchor point 164 and/or to the safety harness 158 is an important feature of the present invention, and various alternative approaches for this detection are contemplated within the scope of this invention. Each of the further embodiments as described below provides communication from the safety lanyard detector 110 to the interface monitoring unit 100. A fault in this connection when the operator 154 accesses control of the lift may result in logging of a violation in the use of safety equipment, for example, data indicating the identification of the operator, date, time, the location of the infraction and other information may be logged each time operation of the lift is attempted without an attachment. The interface monitoring unit 100 may further display or emit a visual and/or auditory warning to the operator 154 to secure the safety restraint, thereby reinforcing and training the operator of the proper safety procedures required in operation of the lift.

The controller 178 and/or the interface monitoring unit 100 may further override of control of the lift, preventing the movement of the lift until a lanyard connection signal has been detected. The controller 178 and interface monitoring unit 100 may be mounted near the control panel 166 within or along the aerial lift basket 152, and either the controller 178 or the interface monitoring unit 100 may be wired or be integrated through a wireless connection to the control panel 166 to stop or control movement of the aerial lift basket 152 if the safety lanyard detector switch 174 is not activated when the aerial lift moves. As further described, embodiments that provide for minimal modifications of existing safety lanyards 156 and other safety devices and that will easily integrate with the interface monitoring unit 100 to provide specific warnings and safety instruction reinforcement and training to an aerial lift operator are important in order to assist in adoption of the interface monitoring warning system 100 on both currently used and new aerial lift equipment.

Figure 8A:
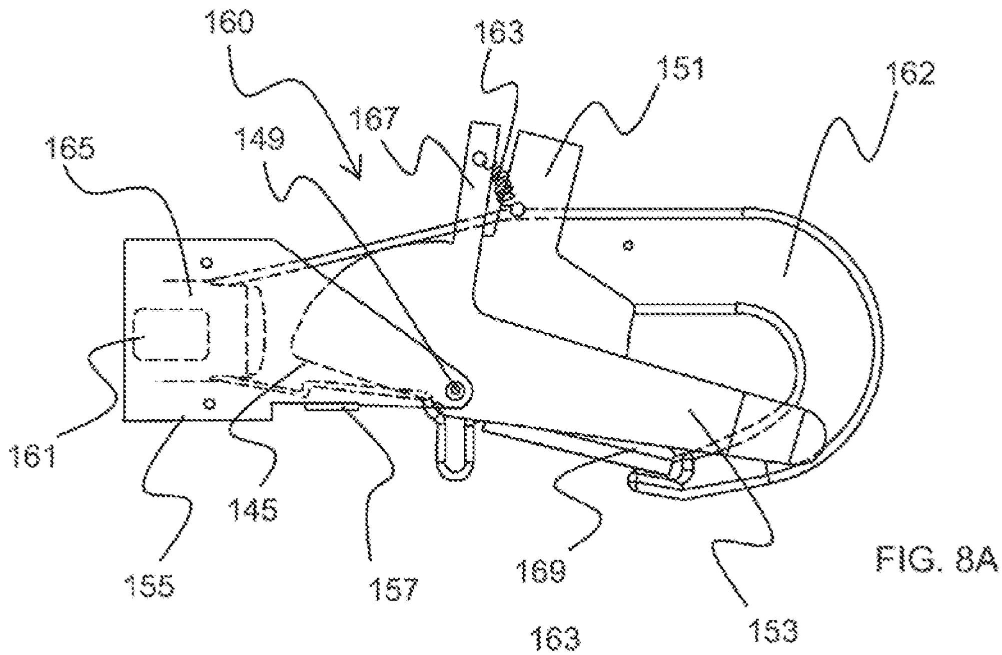
FIGS. 8A and 8B show an embodiment of a retrofittable safety lanyard detection system.
Figure 8B:
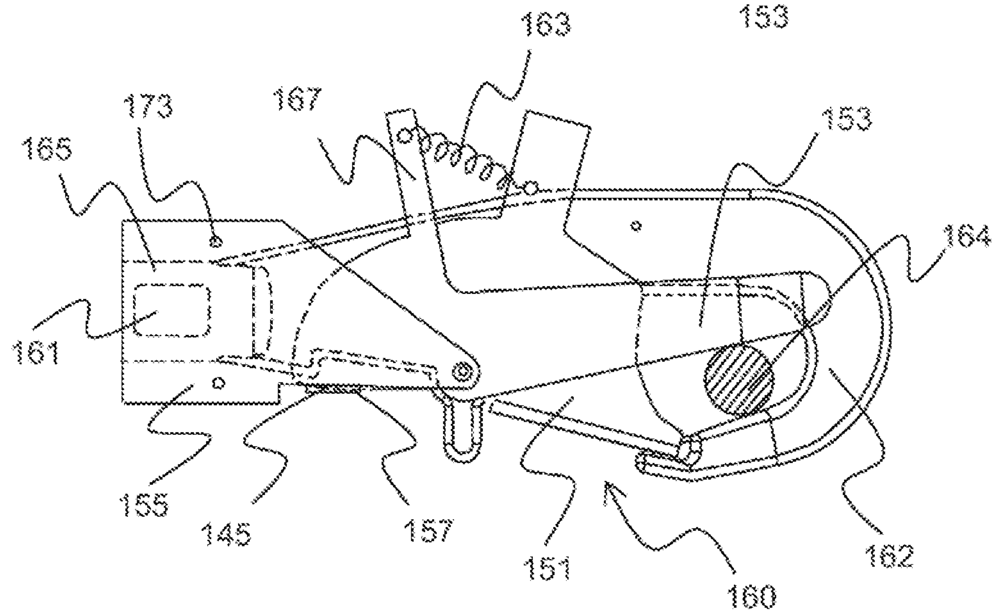

As an example of a retrofit for the safety lanyard 156, a pivot hub attachment detector 160 that includes a latch actuator 151, a detector arm 153, a hub housing 155, a pressure or magnetic switch 157 and a transmitter 161 is affixed to the snap hook 162 as shown in FIGS. 8A and 8B. This configuration may also be adapted to be manufactured with the snap hook to provide an integrated safety lanyard detector 110 within the snap hook 162. The latch actuator 151 and detector arm 153 are affixed to the hub housing 155 at a spindle 149 that allows the latch actuator 151 and detector arm 153 to rotate around the spindle 149. The rotation of the latch actuator 151 and the detector arm 153 coincides with the rotation of the clip 169 of the snap hook with the latch actuator 151 closing with the snap hook clip 169 to secure the snap hook 162 around a portion of the anchor point 164 or harness ring 159.

The detector arm 153 is pushed and rotated around the spindle 149 by the anchor point 164 or harness ring 159 shown in cross-section in FIG. 8B. In forcing the detector arm 153 up and around the spindle 149, the base 145 of the detector arm 153 contacts the pressure or magnetic switch 157 sending a signal to the transmitter 161 that is within or affixed to the hub housing 155. The signal indicates a closed connection of the snap hook 162 and a secure connection of the lanyard 156 to one of either the anchor point 164 or the harness ring 159. The signal transmitted is identified by a wireless receiver 125 such as the one shown in FIG. 23 that is incorporated within the interface monitoring unit 100 and the secure connection of the lanyard 156 is logged with telematic information to the server 102. Alternatively, the receiver may be affixed to one or both of the anchor point 164 and the harness ring 159 with the receiver serving as the safety lanyard detector 110 that subsequently transmits the signal to the safety warning monitoring unit 100. As previously described, with a detection of the attachment of the safety lanyard 156, the interface monitoring unit 100 may stop the audible or visual warnings to the operator to attach the lanyard and in further embodiments send a signal to the boom controls 166 to allow operation of the boom.

The detector arm 153 is held continuously to the magnetic or pressure switch 157 by the support of the anchor point 164 or ring harness 159 while the lanyard 156 is secured to the anchor point 164 or ring harness 159. When the snap hook 162 is opened a spring 163 connected between the latch actuator 151 and an extender 167 of the detector arm draws the detector arm 153 to a closed position with the latch actuator 151 and snap hook clip 169 disconnecting the detector arm 153 from the magnetic switch 157. Upon disconnection of the switch 157 a signal is also transmitted to the receiver 125 and the interface monitoring unit 100 logs to the server 102 that a disconnection has been made. In further embodiments, the interface monitoring unit 100 may after receiving the detached signal determine if the boom is in a raised position by polling the position of the boom arm encoder 117. Additionally, the interface monitoring unit 100 may determine from the operation controls 166 if the boom is moving to an up or down position. A signal may also be sent to the boom controls 166 to halt movement of the boom. Audible and/or visual warnings may also be issued to instruct the operator to reattach the safety lanyard 156. A time interval for reaction time of the operator to respond to the infraction may also be recorded.

Figure 9A:
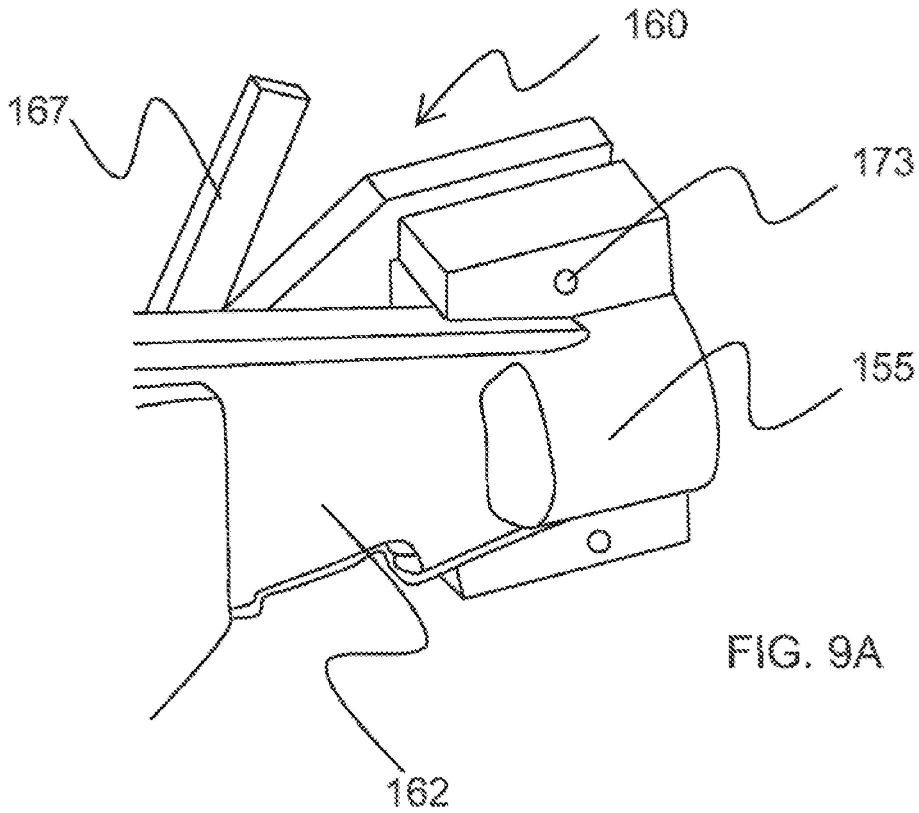
FIG. 9A shows a perspective view of the retrofittable safety lanyard detection system.
Figure 9B:
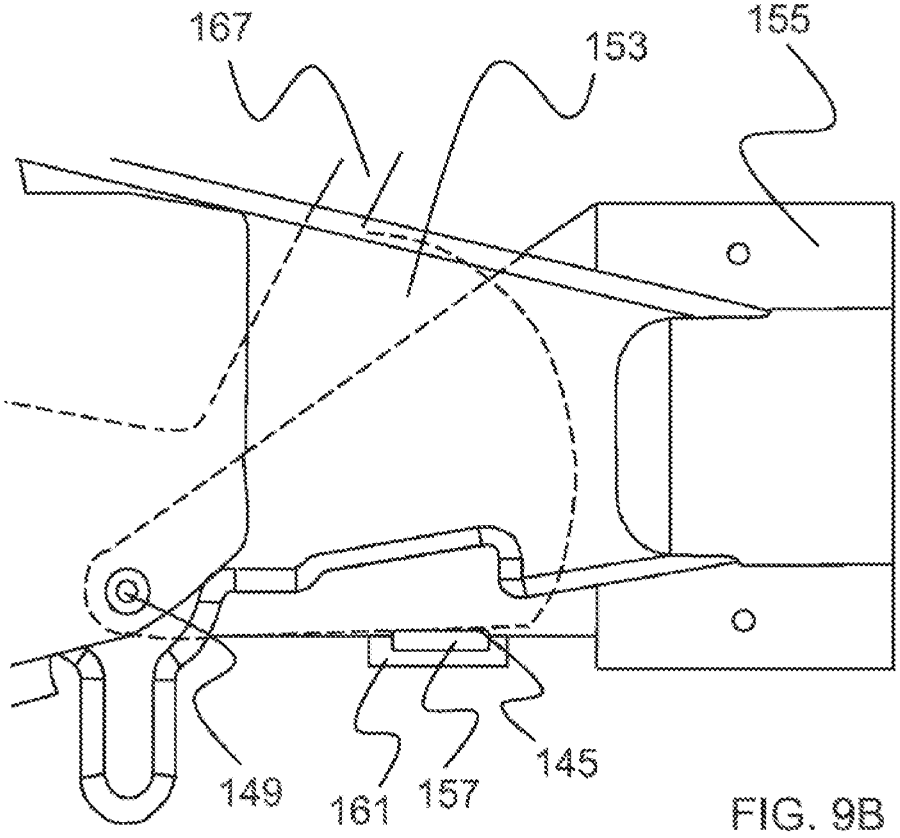
FIG. 9B shows the housing and activation switch of the retrofittable safety lanyard detection system.
Figure 10:
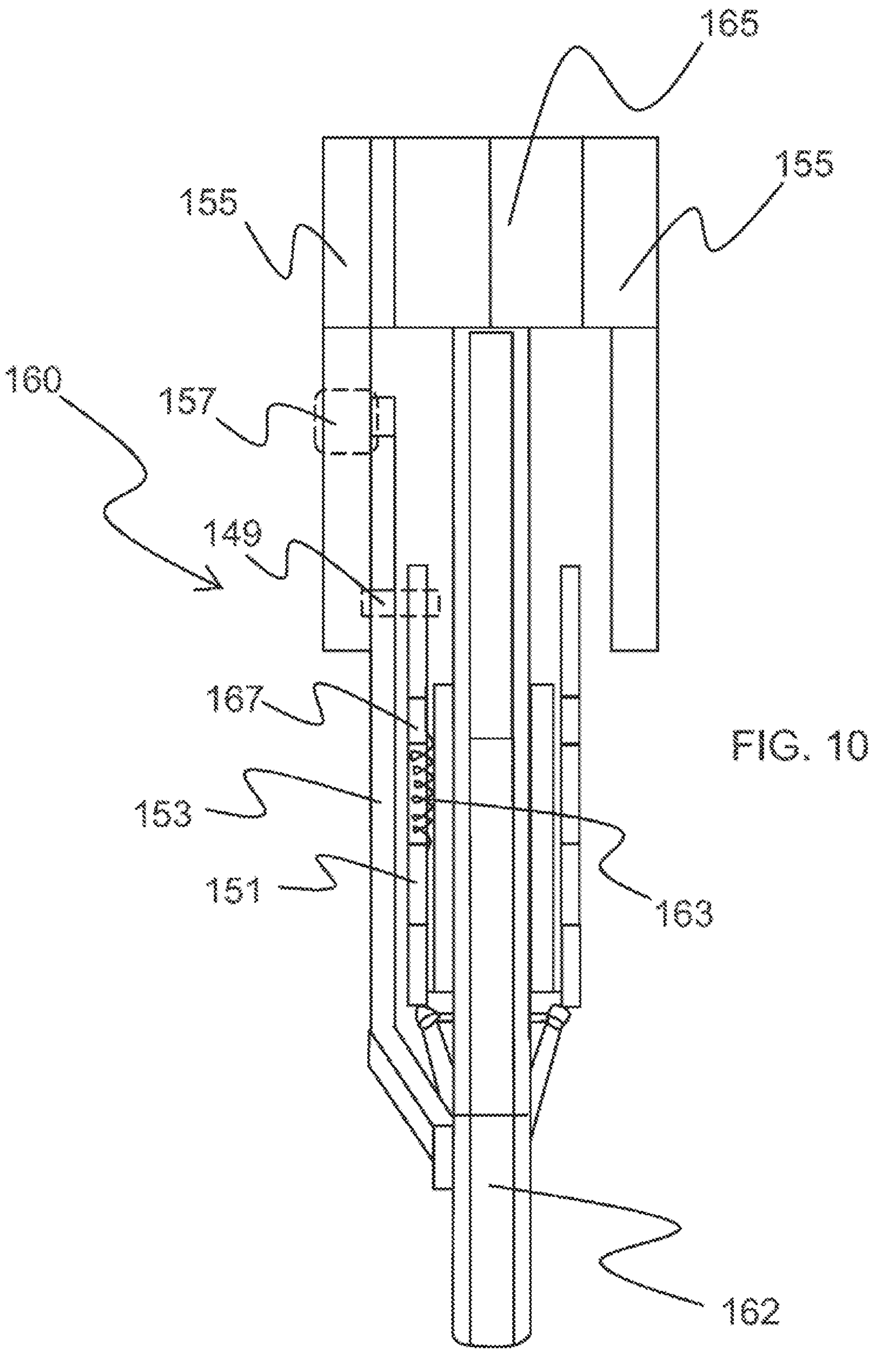
FIG. 10 shows a top view of the retrofittable safety lanyard detection system.
Figure 11A:
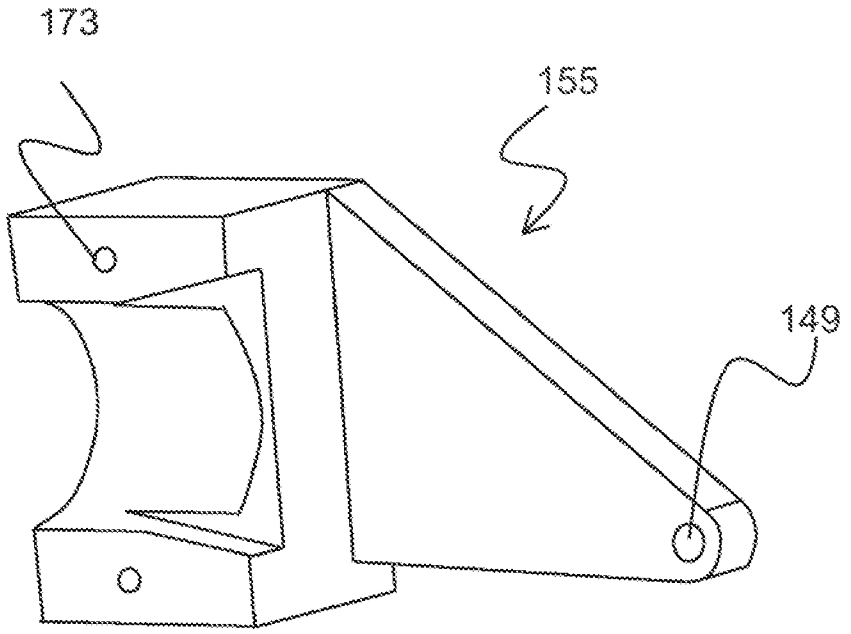
FIGS. 11A and 11B shows perspective views of the housing of the retrofittable safety lanyard detection system.
Figure 11B:
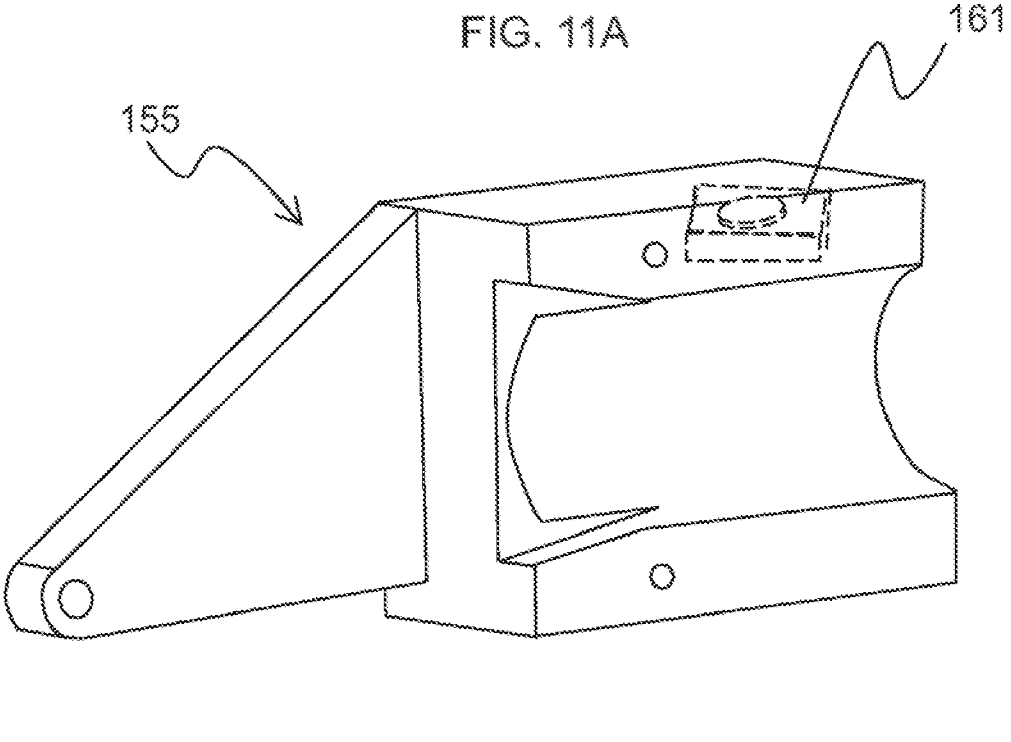

As shown in FIGS. 9A and 9B, one pivot hub actuator assembly 160 is positioned on one side of the safety lanyard 156 with the housing 155 being formed with a rounded rectangular cutout to accommodate the lanyard attachment 165. A mating hub housing 155 is positioned around the snap hook 162 and safety lanyard 156 opposing the actuator assembly 160. The hub actuator assembly 160 is secured to the opposing hub housing using bolts or other appropriate hardware through bolt holes 173 that may be provided to align and secure the housings together around the lanyard attachment 165. A top view of the pivot hub attachment is shown in FIG. 10 and perspective views of the hub housing 155 are shown in FIGS. 11A and 115. A first housing may be extended as shown in FIG. 11B to accommodate and enclose the transmitter 161 within the housing or alternatively the pressure or magnetic switch 157 and the transmitter 161 may be affixed to the hub housing 155.

In a further embodiment more suited to manufacturing of new lanyards as opposed to retrofitting, a continuity connection could be wired between a first snap hook 162 on one end of the lanyard 156 and a second snap hook 162 on the other end of the lanyard 156. In this embodiment, a single transmitter 161 may be affixed to only one end of the lanyard 156. Upon activation and/or deactivation of one or both of the pressure or magnetic switches 157 a signal would be transmitted through a wire affixed along the lanyard 156 to the transmitter 161. The transmitter 161 would then relay the signal to the local anchor point 164 and/or harness ring receiver 159 or to the interface monitoring unit receiver 125 indicating a connection has been made or has been detached at one or both of the anchor point 164 and harness ring 159. The attachment or detachment may then be logged with telematics and other information of system parameters by the interface monitoring unit 100 based on the signals transmitted.

Figure 12:
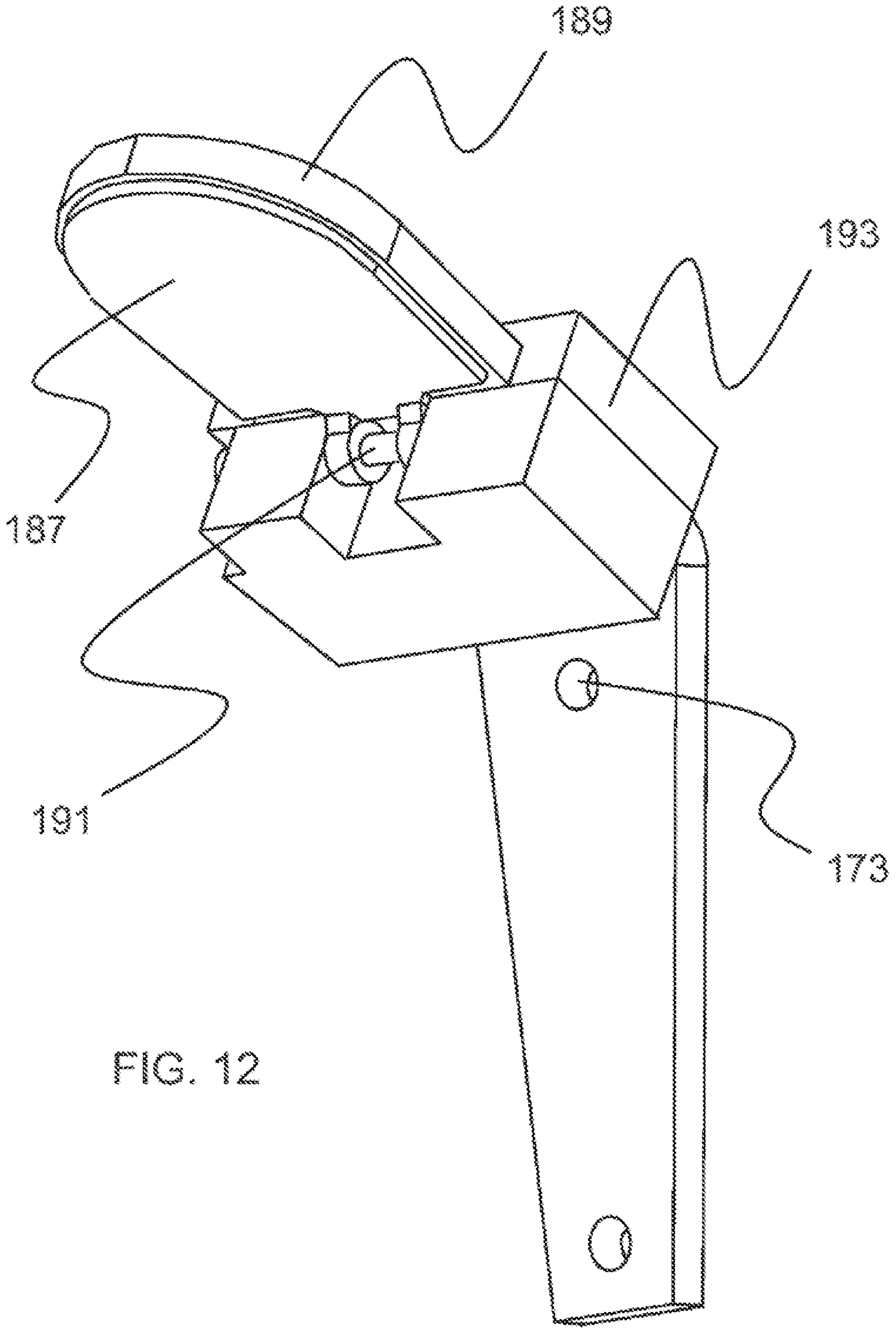
FIG. 12 shows a paddle activation switch as a further embodiment of a safety lanyard detection system.
Figure 13:
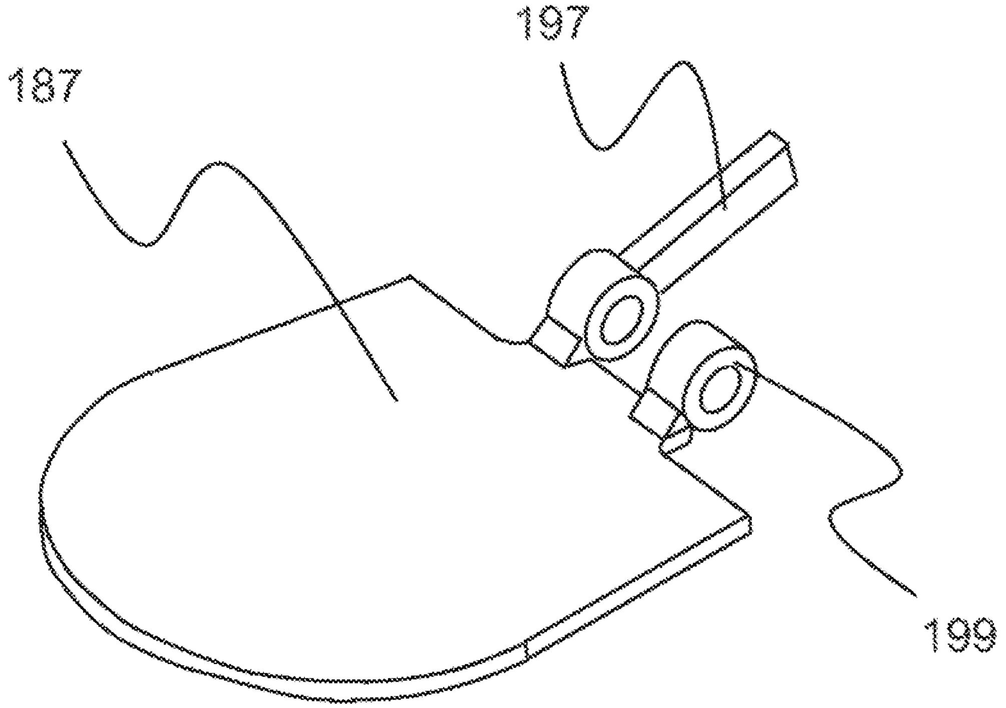
FIG. 13 shows a perspective view the paddle of the paddle activation switch of a further embodiment of a safety lanyard detection system.
Figure 14B:
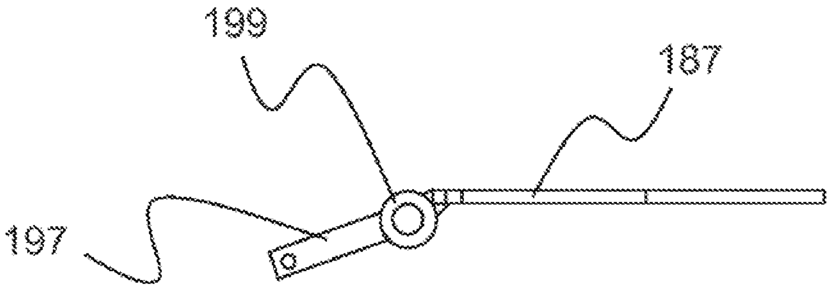
FIGS. 14A-14D shows diagrammatic views of the paddle activation switch of a further embodiment of a safety lanyard detection system.
Figure 14D:
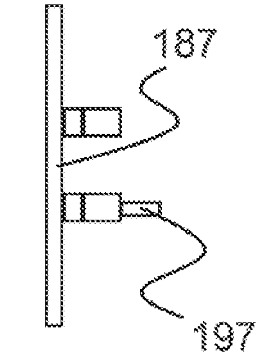
Figure 14A:
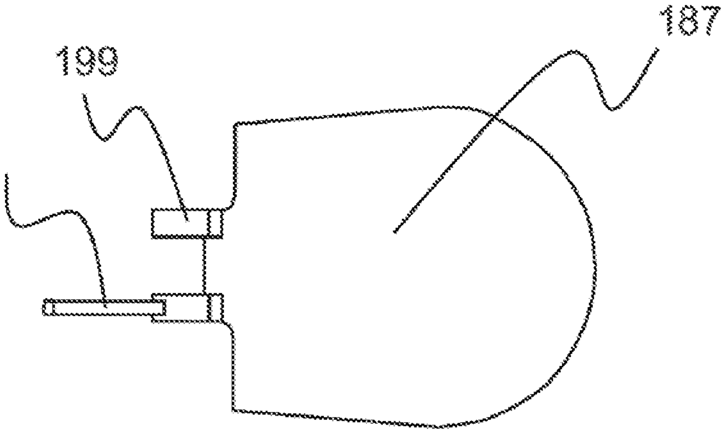
Figure 14C:
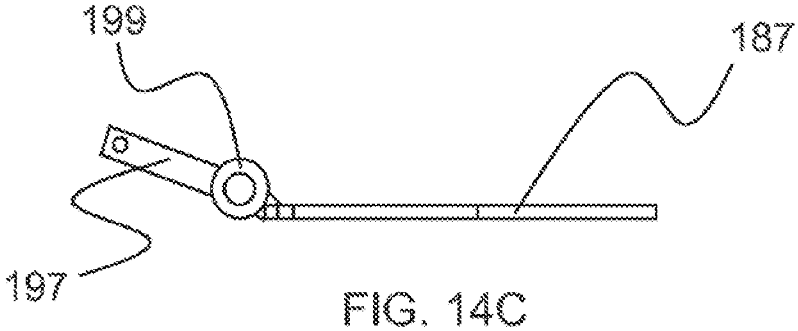

In a further embodiment, the activation switch 157 and transmitter 161 may be positioned at one and/or both of the anchor point 164 and harness ring 159. In this embodiment as shown in FIG. 12, a paddle 187 having a contiguous surface area is dimensioned to mate with one or more configurations of connector rings 189 of an anchor point 164 and/or harness ring 159. The paddle 187 may be of any shape and/or curvature, as shown in FIG. 13, that when positioned against the connector ring 189, the circumference of the ring is within the surface area of the paddle 187. In this way, the connection of a snap hook 162 or other linked attachment to the ring 189 will displace the paddle 187 forcing it to rotate around a hinge 191 and contact an activation switch 157 within the housing 193 thereby transmitting a signal of attachment to the receiver 125.

In a first embodiment, a switch actuator 197 extends from an eyelet 199 of the paddle 187, as shown in FIGS. 14A-14D, contacting a magnetic, pressure, optical or other switch 157 as the paddle is displaced from the ring 189 and rotates around the hinge spindle 191. An attachment or detachment of the snap hook 162 to the ring 189 transmits a signal to the receiver 125 of the interface monitoring unit 100. The housing 193 may be positioned on a mounting bracket 195, as shown in FIG. 12, or may be a block housing with either configuration capable of being bolted to the inside or edge of the basket 152, or of being affixed to the boom 150.

Figure 15:
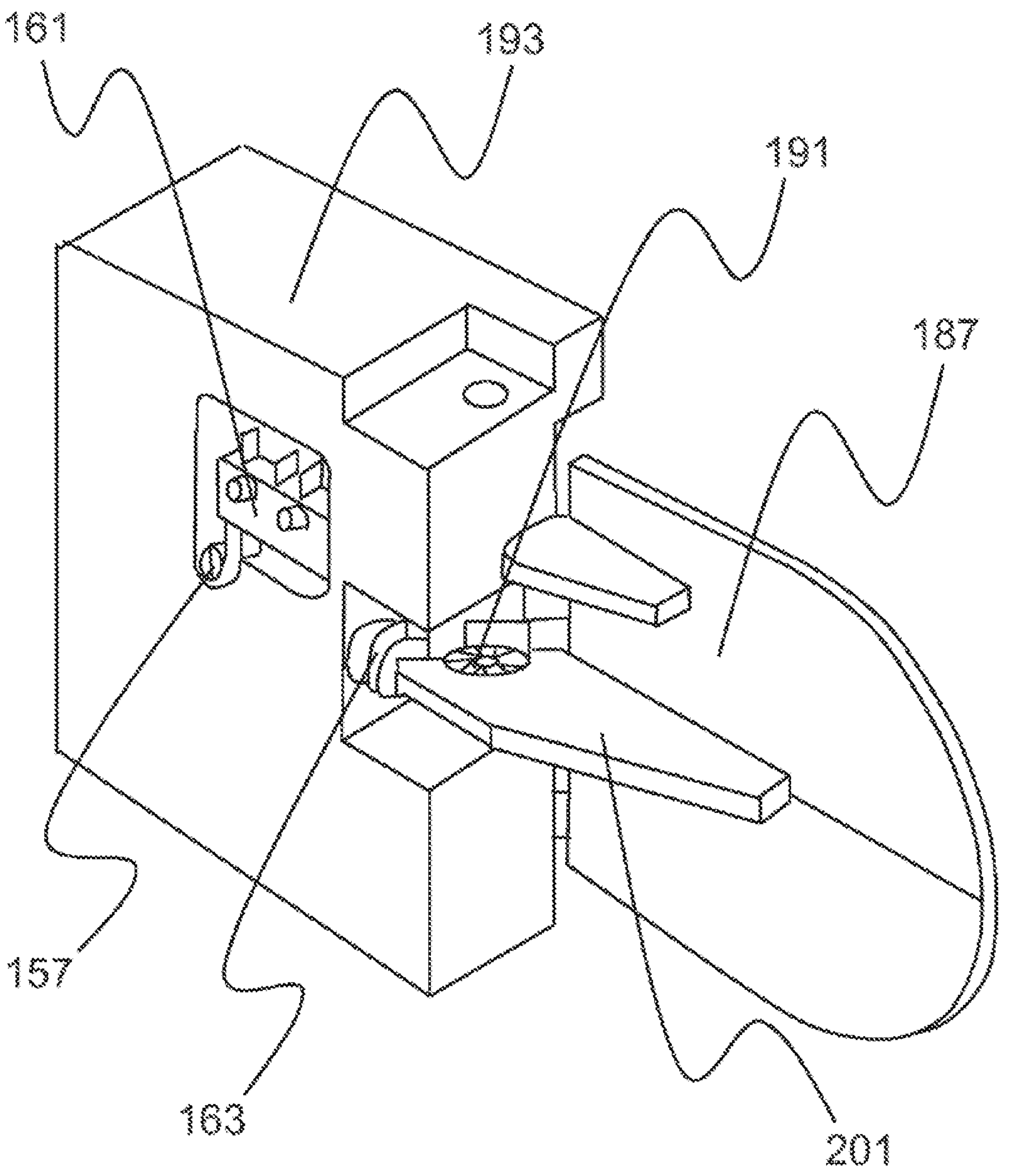
FIG. 15 shows a perspective view of a further embodiment of the paddle activation switch as a further embodiment of a safety lanyard detection system.
Figures 16A, 16B, 16C, 16D:
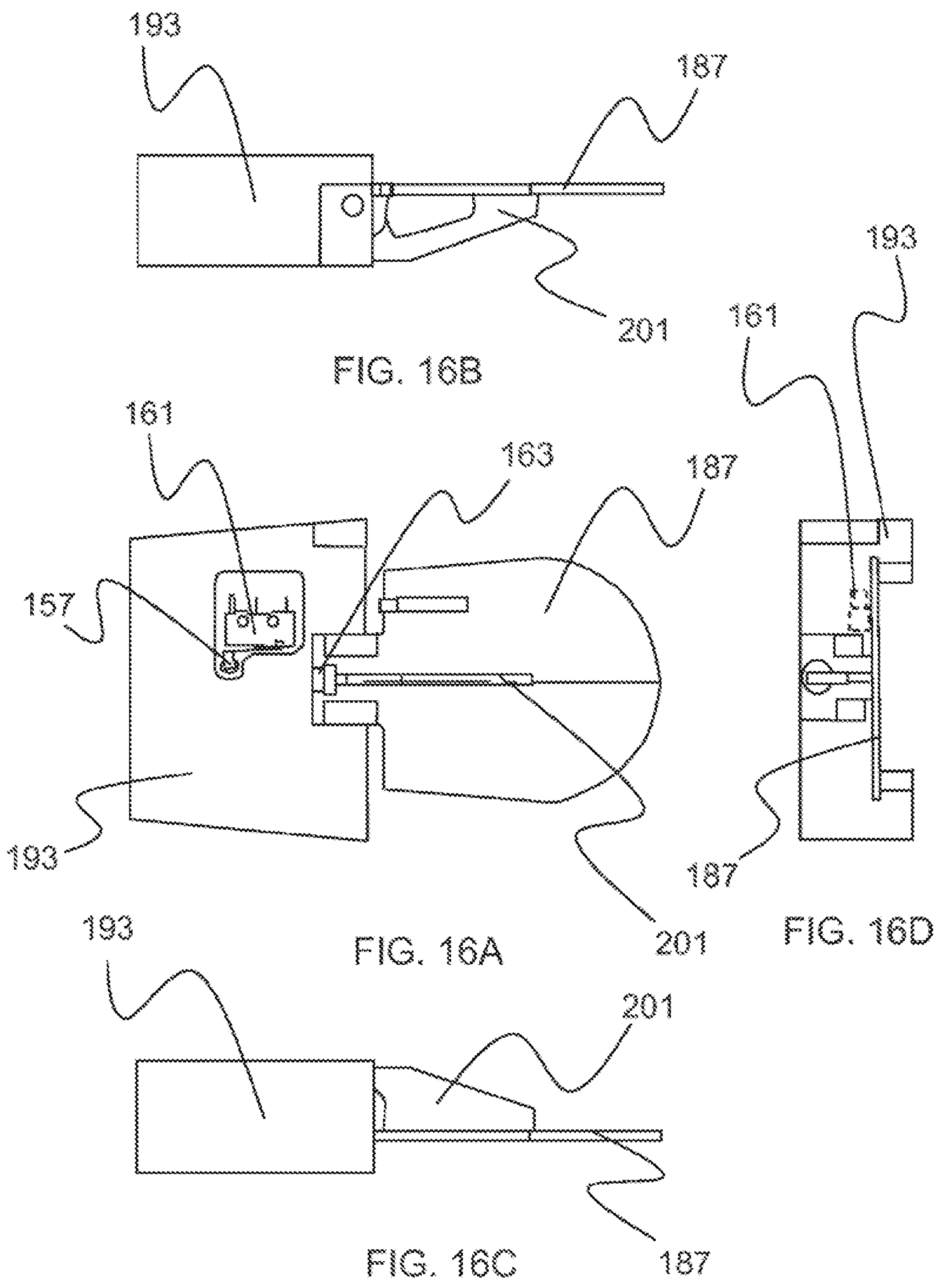
FIGS. 16A-16D shows diagrammatic views of a further embodiment of the paddle activation switch of a further embodiment of a safety lanyard detection system.
Figure 17:
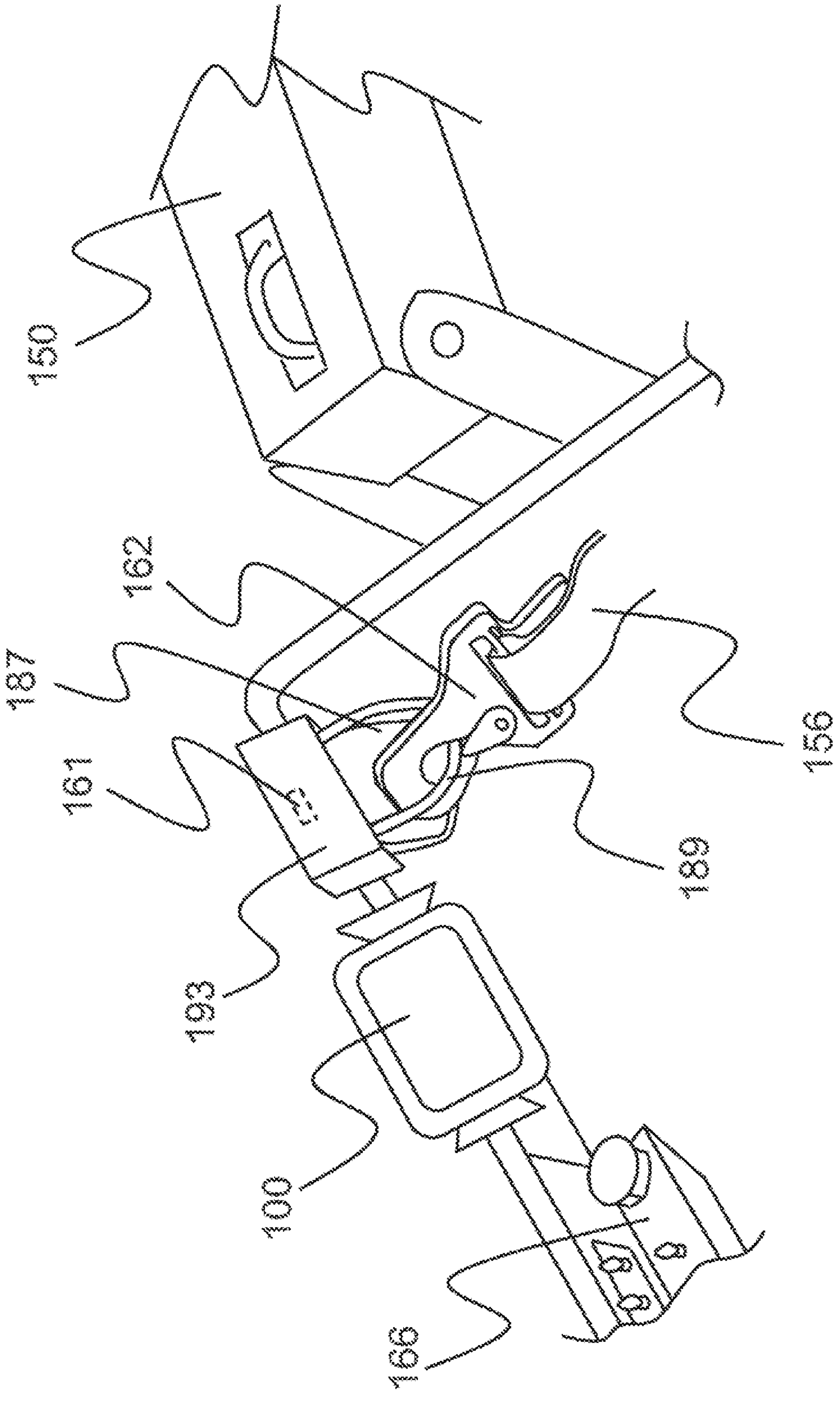
FIG. 17 shows the paddle activation switch as a safety lanyard detection system with the interface monitoring unit.

In this further embodiment, as shown in FIG. 15, the housing 193 may be a metal or plastic composite of a square or rectangular shape. A brace 201 may support the paddle 187 which rotates on a spindle or hinge 191. A spring 163 may be provided in compression with the hinge 191 to maintain the paddle 187 in a normally closed position. In this manner the paddle 187 must be pushed out and away from the connecting ring 189 by the snap hook 162 or other attachment mechanism forcing the paddle to rotate around on the spindle 191 and actuate the detector switch 157. The housing 193 may also provide a compartment or cutout for attachment of a transmitter 161 to relay a signal to a receiver 125 within a controller 178 or at the interface monitoring unit 100. Diagrammatic views of the paddle detector switch 187 are shown in FIGS. 16A-16D. The paddle detector system is activated as the snap hook 162 is attached to the anchor point 164 as shown in FIG. 17.

In addition to the threat of falling over the top edge of the aerial lift work platform 152, there exists a fall hazard presented by the door 170 of the aerial lift work platform. A door lock detector 112 may be installed to send a warning signal if the door is not properly secured. The door latch detection system 112 may detect both a primary interlock door latch and/or a secondary door security system such as the connection of a chain or strap in addition to a door latch. One or more other safety devices for fall protection and other hazards may be affixed to or used within the aerial lift system, and in this first embodiment six separate devices are shown, however these are shown as an example and the interface monitoring unit 100 may be used with one or all of these devices as well as with other devices, for example warnings or reminders to the operator to be sure to place wheel chocks or safety cones, etc. are contemplated within the scope of this disclosure. These types of reminders can be programmed into the device by safety coordinators and/or manufacturers in such a manner as to reinforce safety procedures and may be set to trigger based upon how many times the lift operator has activated the lift up motion, for example every five times the lift goes up, the operator is reminded to place or verify that cones and wheel chocks are positioned properly.

Figure 23:
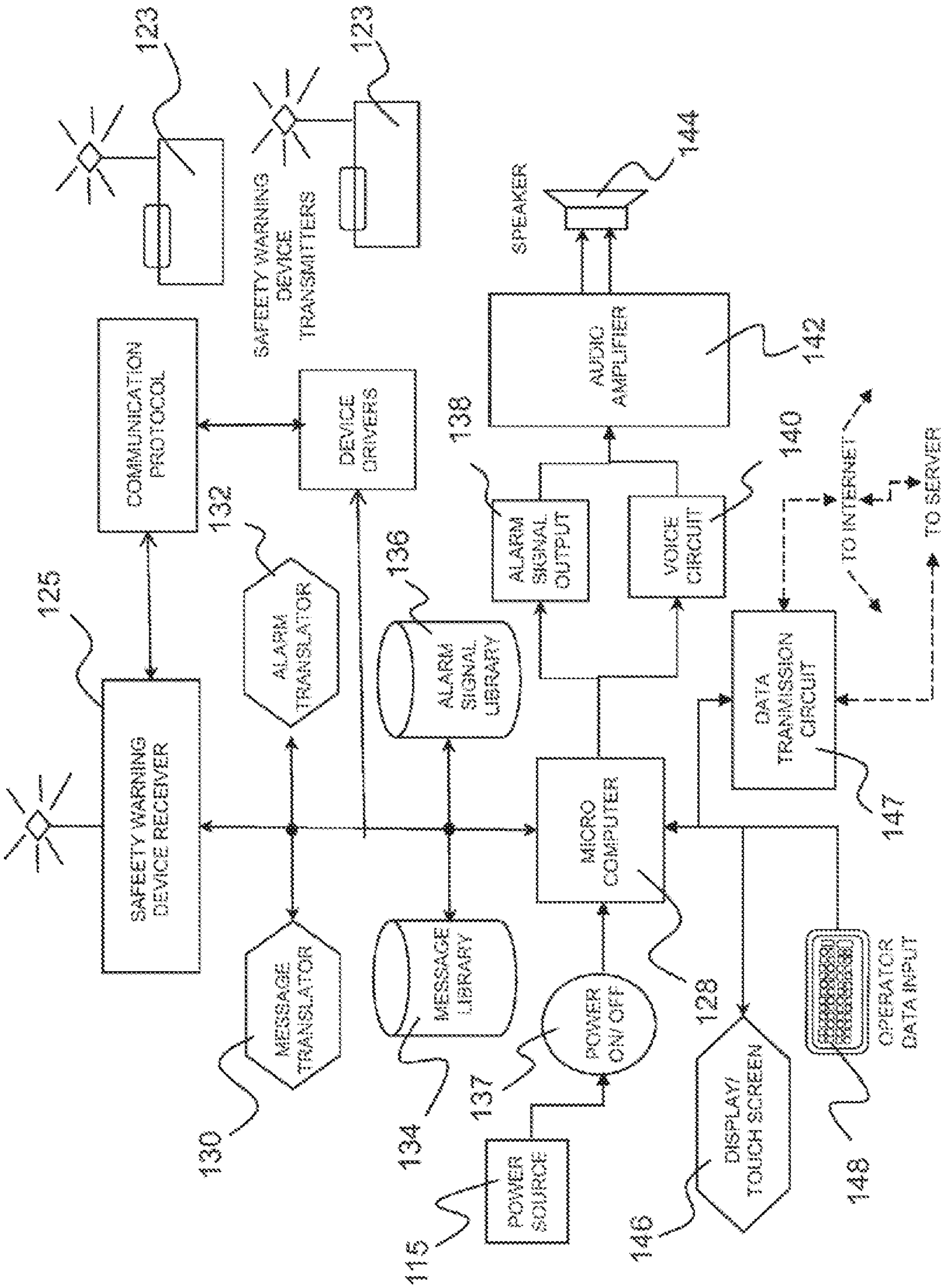
FIG. 23 illustrates a schematic of a further embodiment of the interface monitoring unit.

The interface monitoring unit 100 for a fall protection system may be affixed to the aerial lift boom 150, the work platform or basket 152 or an extension thereof, or may be strapped to the operator 154 with the use of headphones to deliver instructions and warning messages. Each safety detection device may be directly connected to the interface monitoring unit 100 through one or more data ports 124 of FIG. 2, or alternatively as shown in FIG. 23, a remote wireless transmitter 123 may be directly connected to the safety device and a data receiver 125 within the interface monitoring unit 100 may receive warnings and fault conditions remotely through an RF or wireless transmission.

The power source 115 for the interface monitoring unit 100 may also be affixed to the aerial lift boom 150, or affixed within or to the work platform or basket 152 or an extension thereof so that wires or conductors are not used to reduce the risk of electrical shock to the operator. In an embodiment of the present invention, the power source 115 may be a charging system 250 and battery 258, with a hydraulic power AC/DC alternator/generator 252 with electrical/hydraulic regulation to charge the battery 258 and provide power for the interface monitoring unit 100.

The hydraulic powered AC/DC generating system 252 may be mounted at the boom tip or personnel platform of an aerial lift, crane or scissor lift, above the insulated portion of the boom if so equipped. The powered system 252 provides a continuous AC or DC power source at the personnel platform 152 in order to provide power for the interface monitoring unit 100 and/or for wireless controls, fiber optic controls, battery charging, work light, hydraulic or electrical actuators, two-way communications, telematics, and all other AC or DC power needs to operate, control, communicate, Increase productivity and protect the equipment and/or the operator. The present invention addresses this need and eliminates the requirement for battery removal and recharge as well as provides a permanent power source for controls and accessories. By providing power above the insulation, the invention meets power requirements at the platform 152 while continuing to maintain the insulating qualities of the aerial lift.

Figure 18:
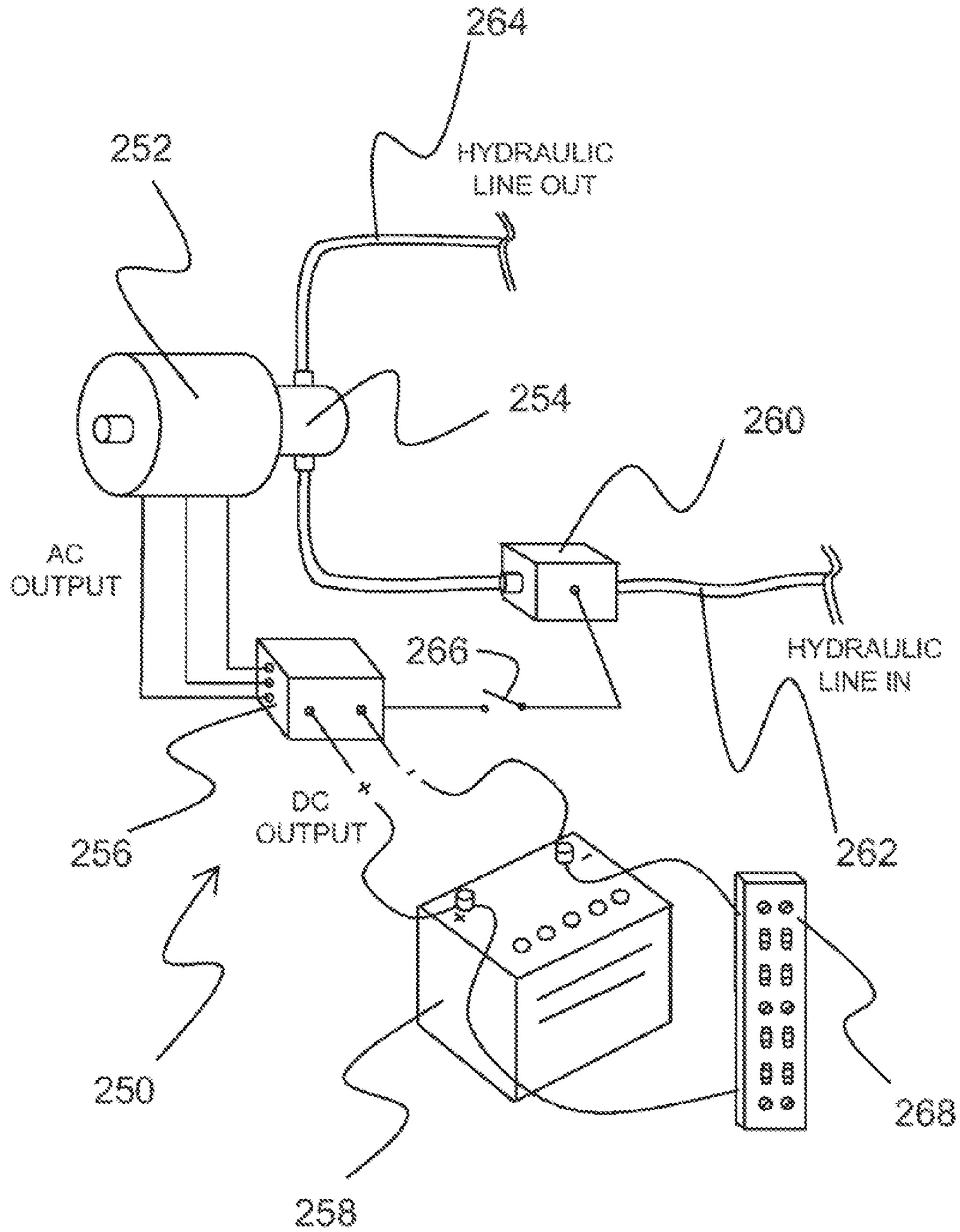
FIG. 18 illustrates a first embodiment of the interface monitoring unit with a first embodiment of an isolated power source that may be used with the unit.

In operation as shown in FIG. 18, the AC/DC generating system 252 has a hydraulic motor 254 connected to hydraulic input and output lines that are tapped off of the hydraulic fluid lines that maneuver boom 150 and hold the work platform 152 in place. The fluid pump and other components of this hydraulic system are within the truck 168 or prime mover. Control valves within a hydraulic regulator 260 control the operation of the hydraulic motor 254. The hydraulic motor 254 powers an AC generator 252 that is connected to an electrical regulator/rectifier 256 that converts the AC output to DC to charge a battery 258. A terminal block 268 connected to the AC generator 252 (not shown) or battery 258 provides electrical connections to power the interface monitoring unit 100 or other power systems within the work platform 152 providing both AC and DC power where necessary to accommodate power requirements.

By tapping off of the existing truck hydraulic system, the charging system and battery remain isolated from any external electrical systems within the truck or boom controller, preventing the risk of electrical shock for the operator 154 within the basket 152. The hydraulic powered AC/DC generating system 252 may be scaled to provide adequate power requirements within a range of 2-1000 watts depending upon the power needs of the interface monitoring unit 100 and other powered components within the basket 152.

The interface monitoring unit 100 monitors and records status and fault conditions from one or more safety devices. The status monitoring may be constant for certain safety equipment such as; a high voltage proximity warning device, or wind speed detector or intermittent for other safety devices where a no fault condition is detected and then periodically checked for status changes. The poling time interval may be determined by the specific safety equipment. In addition to status checks the interface monitoring unit 100 receives all output data from a directly or remotely connected safety device and immediately translates the condition to a visual or audible warning, an alert, and/or an instruction to properly inform the operator 154 of the fault and the proper safety procedure for fault recovery.

Figure 19:
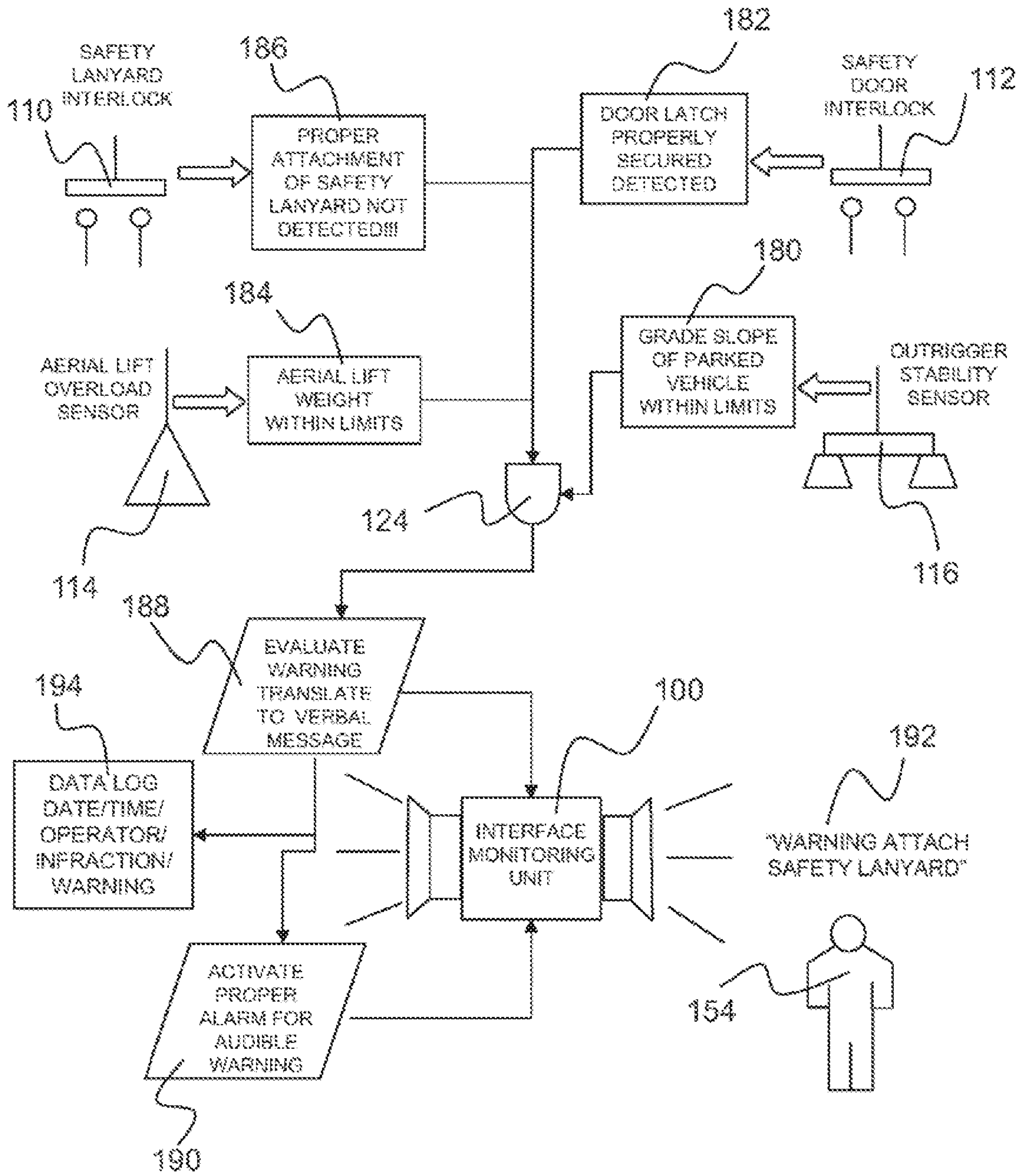
FIG. 19 illustrates a first embodiment of the interface monitoring unit with safety warning devices.

As shown in FIG. 19, the interface monitoring unit 100 may have one or more safety devices connected through its data ports 124 and any output from a device is captured and translated. In the example shown, the interface monitoring unit 100 detects the vehicle is parked properly on a shallow enough gradient so no warning 180 is issued by the outrigger stability sensor 116. The door latch to the basket 152 is properly secured so no warning 182 is issued by the safety door interlock 112. The weight of the work platform or basket is within tolerance limits so no warning 184 is issued by the aerial lift overload sensor. However, attachment of the safety lanyard is not detected and a warning 37 is received by the interface monitoring unit 100. The interface monitoring unit 100 receives the warning and evaluates the fault condition within the message translator 188 or the alarm translator 190. In this example the interface monitoring unit 100 verbalizes a reminder to the operator that the safety lanyard 156 is not attached 192. The warning will be repeated until attachment of the safety lanyard 156 is detected. The date, time, operator name, job information, vehicle or lift device and fault condition are transmitted by the interface monitoring unit 100 to the data server 194. After the warning is repeated a timer measures the delay of attachment of the safety lanyard 156 and sends a fault infraction message to the data server at intervals of approximately every ten (10) seconds until an attachment of the safety lanyard is detected. The attachment of the safety lanyard 156 is also logged to provide for analysis of the lift operator's adherence to safety protocols and procedures as described above.

Operator name, vehicle or lift device job information and other telematics information may be determined from data input by the operator or from the specific vehicle, or specific lift device and/or from log information on the data server. In a further preferred embodiment, the lanyard connection detector 110 includes an iButton auto-identification device such as that made by Dallas Semiconductor Corporation of Dallas, Texas. These devices and other comparable devices are essentially semiconductor memories which are accessed using two electrical connections: (1) power/data and (2) ground. These programmable memory devices are roughly the size of a conventional lithium battery and may be sewn within the safety lanyard and stored with the operator's name, training level and other information regarding which operator used which aerial lift at what time. The iButton further includes status memory that may function as a current sensor and be used to determine how many times the aerial lift boom operator failed to attach or removed his/her safety lanyard prior to and during operation of the aerial lift work platform. This with the data logging features of the interface monitoring unit 100 can be useful in safety monitoring and compliance control by government agencies such as OSHA as well as providing indications to safety management as to which aerial lift operators require additional safety training.

Figure 20:
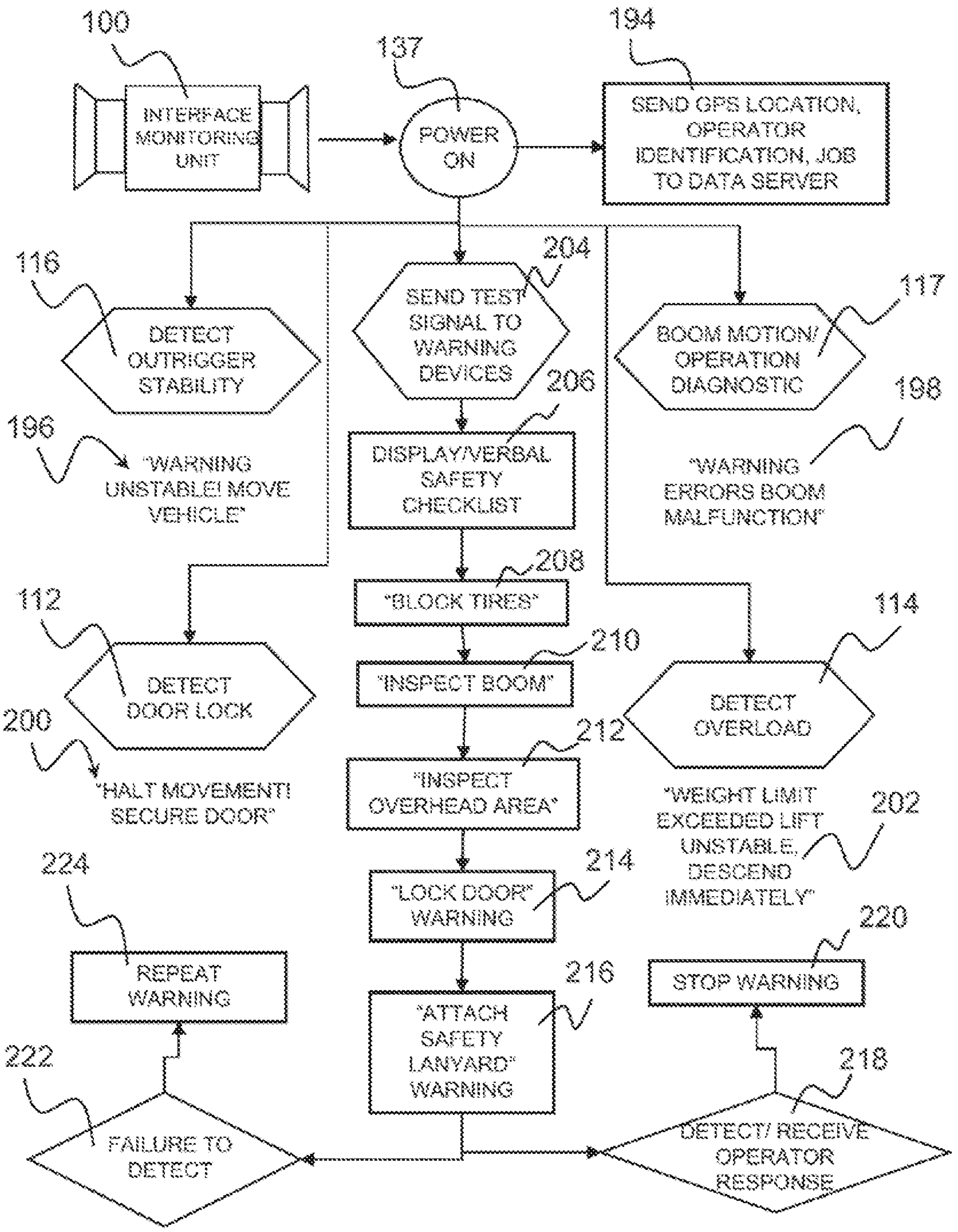
FIG. 20 illustrates a flow diagram of the interface monitoring unit with safety warning devices.

When a safety warning is received the interface monitoring unit 100 determines an appropriate verbal, audible or visual alarm warning for conditions that require immediate attention and reaction or a verbal message is issued to reinforce a safety procedure or reiterate an earlier announced warning. As shown in FIG. 20, a specific warning may be verbalized to instruct the operator in the proper procedure. For example, a fault condition from a weight overload sensor may verbalize "Weight Limit Exceeded!" "Lift Unstable!" "Descend Immediately!" 202 or if the door latch is not detected verbalize "Halt Movement!" "Secure Door!" 200 or other reinforcing instructions to the operator to affect an immediate response and prevent the operator from continuing in an unstable condition.

The interface monitoring unit 100 may also upon powering up, communicate with one or more telematics systems 121 to transmit the GPS coordinate location, vehicle, operator and job information to the data server 194 and send test signals 204 to each safety device to confirm proper operation. The unit may further receive diagnostic information from the boom 117 and verbalize error information 198 reducing a common cause of failure and injury; or may instruct the operator to "Move the Vehicle!" 196 because an unstable slope in the parking of the vehicle is detected from the outrigger stability device. A further benefit from the unit is the display and/or recitation of a checklist 206 of preferred safety procedures. For example, simple instructional steps 208-216 may be expressed and upon completion of each step the operator may acknowledge the completion by selecting or entering an affirmative response 218. If an affirmative response is received and a proper condition from the safety device is detected, the warning will stop 220. If the proper condition is not detected 222 the warning will repeat 224 and the infraction will be logged by the interface monitoring unit 100 and be transmitted to the data server 194. Each repeated warning and delay in curing the fault condition will be logged and sent to the server to provide tangible records of an operator's failure to respond to a safety requirement. In addition to the logging of infractions, the detection of sensors may also be logged with additional status and telematics information to provide for a forensic analysis of adherence of the lift operator to safety standards, and/or to assist in understanding any failures or infractions that led up to and may have contributed to an accident.

Figure 21:
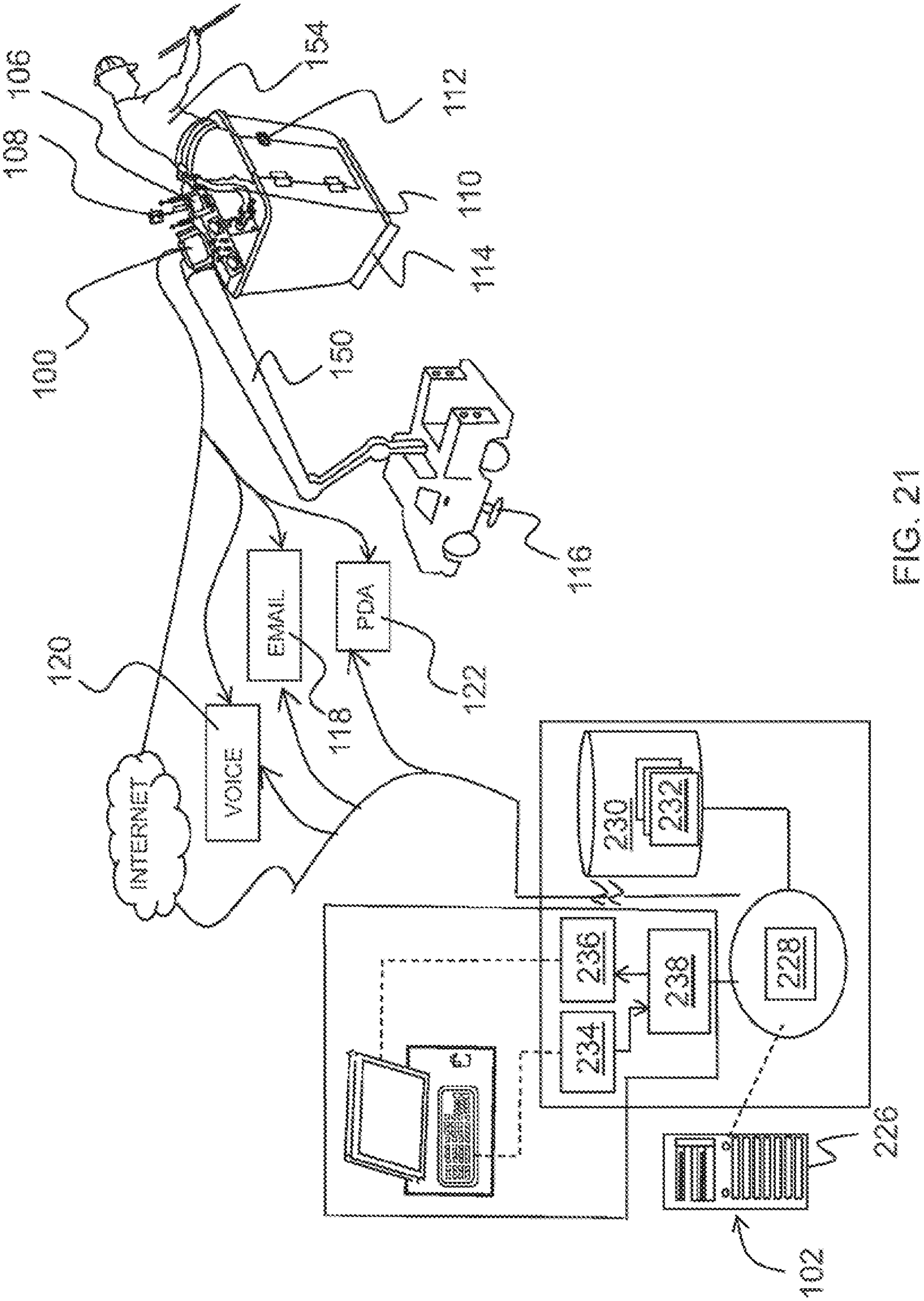
FIG. 21 illustrates a conventional aerial lift work platform with vehicle and the interface monitoring unit of the present invention with a number of safety warning devices and a data server.

The verbal commands and detection of fault conditions with data logging of infractions allows a clear picture of an operator's adherence to safety procedures in the field where they may not normally be supervised. A data log for an operator may be sent to an internal data server 102 as shown in FIG. 21. The data server comprising a computer 226, software 228 and databases 230 such as information logging databases that may allow each individual record 232 including safety adherence, safety infractions, telematics, diagnostic and other data of an operator to be compiled into individual reports 234, or be combined with other operator reports 236 into companywide statistical reports 238 for quality review and training. In a compiled report 238 issues over a period of time may be highlighted, providing an opportunity for training on specific faults, thereby reinforcing proper procedures and keeping the operator alert and respectful of the dangers that are inherent in this type of machinery operation. Data logging as well provides a company with statistical information to support the success or failures of their approaches to safety training, and demonstrates to government organizations like OSHA the tangible commitment of a company to reduce accidents and injuries in the use of their industrial equipment.

The interface monitoring unit 100 and logging of infractions also provides for distribution of a serious issue or fault condition using email, text messaging to a PDA, iPod, tablet or other device to alert other operators of the condition or to provide direct calls to emergency personal in the case of accident or injury. Alternatively, the data server 102 may distribute logged data information to superiors, training personal and operators to address issues as efficiently as possible.

Figure 22:
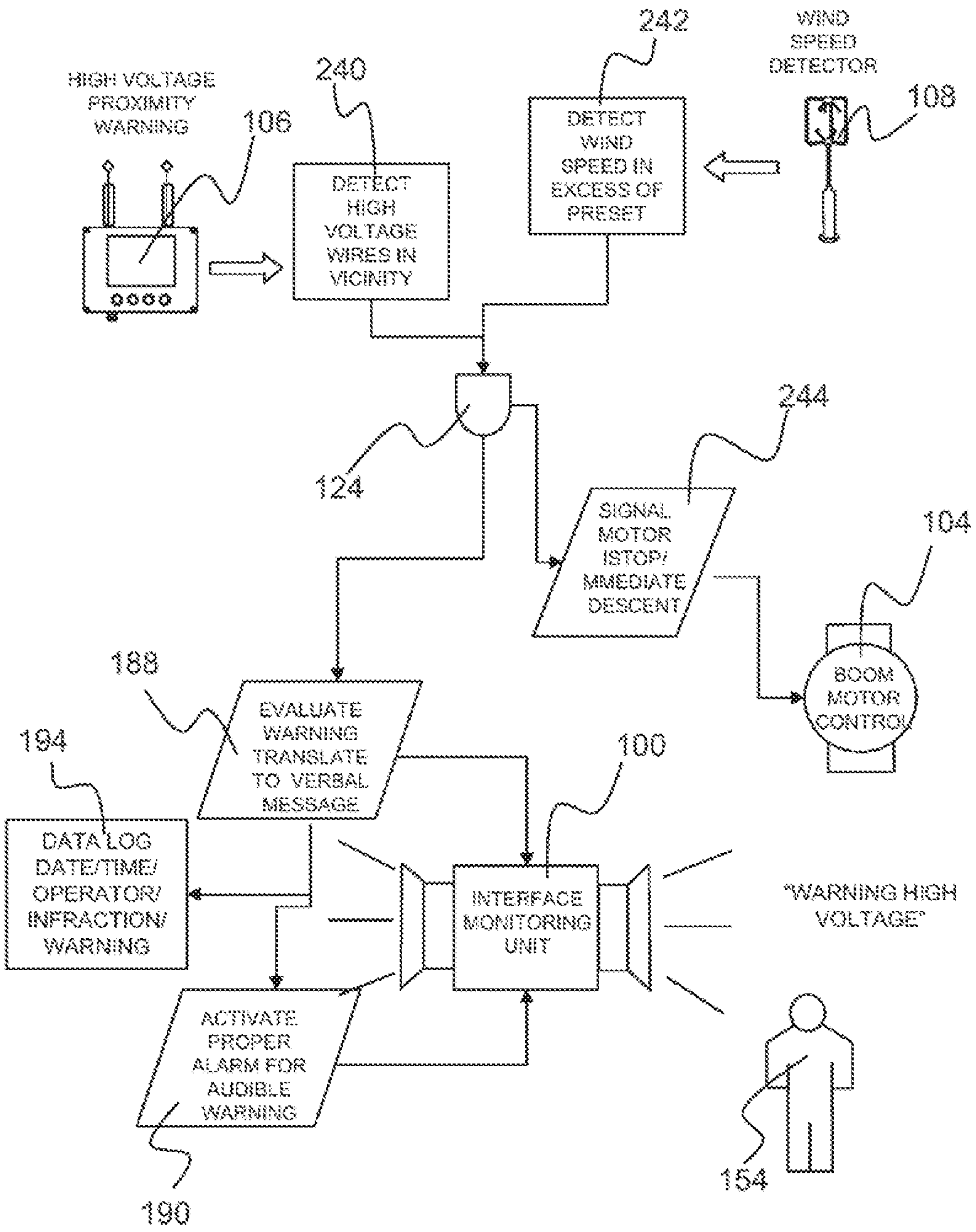
FIG. 22 illustrates another embodiment of the interface monitoring unit with safety warning devices.

In a further embodiment as shown in FIG. 22, the interface monitoring unit 100 may be integrated with the power and motion controls 104 of the boom motor using boom position encoders 117 or other devices so that in the event of a serious fault condition movement of the boom may be stopped or controlled to immediately move the aerial lift work platform downwards or otherwise away from the danger zone. For example, if a fault condition from a proximity warning device 240 signals high voltage wires within a vicinity of the work area the interface monitoring unit 100 may issue a verbal warning "Warning High Voltage!" and stop the boom motor control 104 from ascending. In a further embodiment, position encoders 117 could detect the height of the boom end above a specific distance such as a height above the standard range of 18 feet to 26 feet for telecom and cable wires where power wires are mounted at a distance of 48" above this standard height. For example, the height of the boom could be monitored and if the height including the height of the operator exceeded a preset minimum height of a safe working distance, a warning such as "Look out for Power Wires Above" could sound. These position encoders 117 may be used on articulated, telescopic, scissor or articulated/telescopic aerial lifts and platforms.

In a further example, a fault condition from a wind speed indicator may be translated by the interface monitoring unit 100 as "Excessive Wind Speed!" "Descend Immediately" and the boom may be controlled to carefully descend away from the imminent danger. Appropriate alarms from the interface monitoring unit would also signal in either case.

In instances where it is desirable to maintain a high degree of isolation of the operator 154 and the work platform 152 from electrical systems external to the platform for example in power line maintenance machinery, a direct wiring of safety devices may pose an electrical shock risk to the operator 154. The 1/0 device 126 for attachment of safety devices to the interface monitoring unit 100 may be replaced with RF range or wireless range remote transmitters 123 as shown in FIG. 23. A remote transmitter would be affixed to the output of each of the safety devices and any output signal from the device would be transmitted and received by data input receiver 125 on the interface monitoring unit 100. After initialization by the interface monitoring unit 100 with a test signal to a safety device, device drivers through the communication protocol circuit would be downloaded and communication with the device through the remote transmitter would be initiated. The removal of wire connections to the devices allows devices to be positioned farther away from the operator, but still have warnings directed at the operator from the interface monitoring unit 100, an important feature in a noisy industrial environment. A wireless remote connection also allows the interface monitoring unit 100 to be used in electrically sensitive areas where a spark or shock could cause damage.

The approach given in these embodiments have the advantage of providing additional safety support for the operator in the event of a potential fall, or external hazard to the aerial lift work platform. Further by utilization of the auto-identification semiconductor device or other systems, and data logging it is possible to determine problem areas in training and address specific concerns to improve the overall adherence in the use of safety equipment and procedures. This is a highly desirable result given that most aerial lift operators are unsupervised in the field and as such there is very little positive monitoring which can be performed once the aerial lift operator is on the job and using the aerial lift.

Accordingly, a system and method for providing an interface monitoring unit for safety and fall arresting equipment is presented. Significantly, this system takes a positive approach to preventing injury to aerial lift boom operators and the like with respect to injuries caused by falls and similar accidents. It should be realized that the present invention may be incorporated into a more widespread aerial lift safety threat management system for incorporating specific verbal, audible and/or visual alarms that permit safety feedback information to be given to the operator. The interface monitoring unit specifically configured to integrate with both new and existing safety equipment to promote wide spread adoption of the device to assist in the prevention of injuries in the use of aerial lift work platforms. In these circumstances, the aerial lift operator can be informed of corrective safety measures should he/she attempt to operate the aerial lift work platform without proper safety measures in place.

Modifications and substitutions by one of ordinary skill in the art are considered to be within the scope of the present invention which is not to be limited except by the claims which follow.

What is claimed is:

1. A method of integrating a safety protection system into an aerial lift apparatus comprising the steps of:
- providing a work platform for supporting and moving a person to a work location;
- attaching a monitoring system to the work platform for receiving and transmitting data;
- locating a plurality of detectors on the work platform to communicate with the monitoring system;
- providing a server for at least one of receiving, storing and transmitting data and commands and communicating with the monitoring system;
- receiving a first operational condition from a first of the plurality of detectors indicating activation of a switch of the work platform;
- receiving a fault condition from a second of the plurality of detectors indicating detachment of a lanyard;
- issuing a warning from the monitoring system;
- repeating the warning until receiving a second operational condition from the second of the plurality of detectors indicating attachment of the lanyard indicating the fault condition is cured;
- logging the first operational condition with a first date and time, the fault condition from the second of the plurality of detectors with a second date and time, and a fault message at intervals after the warning is issued until the fault condition is cured, and the second operational condition from the second of the plurality of detectors to the server provided for at least one of receiving, storing and transmitting data and commands and communicating with the monitoring system; and organizing the transmitted data from the monitoring system to the server with at least one database according to predetermined categories.

2. The method of integrating the safety protection system into the aerial lift apparatus as set forth in claim 1 further comprising the steps of transmitting a signal to halt movement of the work platform; and transmitting the signal to the server for recording in a predetermined category in the database.

3. The method of integrating the safety protection system into the aerial lift apparatus as set forth in claim 2 further comprising the steps of:

associating data or metadata of said first date and time and said second date and time with the signal to halt movement of the work platform by the monitoring system; and transmitting said data to the server for recording in the predetermined category in the database.

4. The method of integrating the safety protection system into the aerial lift apparatus as set forth in claim 1, wherein the monitoring system is in wireless communication with the server.

5. The method of integrating the safety protection system into the aerial lift apparatus as set forth in claim 1 further comprising the step of:

storing within a memory storage device of the monitoring system at least one of a message library and an alarm signal library containing respective message and alarm data.

6. The method of integrating the safety protection system into the aerial lift apparatus as set forth in claim 1, wherein the monitoring system is in wireless communication with at least one of the plurality of detectors.

7. The method of integrating the safety protection system into the aerial lift apparatus as set forth in claim 1, wherein the monitoring system is powered from an independent power source using a hydraulic motor with the work platform to electrically insulate the work platform to prevent risk of electrical shock to an operator of the aerial lift apparatus.

8. The method of integrating the safety protection system into the aerial lift apparatus as set forth in claim 1 further comprising the step of:

providing, via the monitoring system, active controls for an operator to receive and access one of at least diagnostic, training, and safety procedural data.

9. A method comprising the steps of:

receiving, by a monitoring system in communication with a plurality of detectors attached to a work platform, a first operational condition from a first detector of the plurality of detectors, the first operational condition indicating movement of the work platform;

receiving, by the monitoring system, a fault condition from a second detector of the plurality of detectors, the fault condition indicating detachment of a lanyard;

issuing, from the monitoring system, a warning;

repeating, by the monitoring system, the warning;

receiving, by the monitoring system, a second operational condition from the second detector, the second operational condition indicating the fault condition is cured;

in response to receiving the second operational condition, ceasing issuance of the warning; and logging, by the monitoring system at a server in communication with the monitoring system, the first operational condition and the fault condition in association with a date and time, and a fault infraction message at intervals after the warning is issued until the fault condition is cured, and the second operational condition.

10. The method as set forth in claim 9, further comprising the steps of:

transmitting, to the server for recording in a predetermined category in a database, a signal to halt movement of the work platform.

11. The method as set forth in claim 10 further comprising the step of:

transmitting date and time data or metadata to the server for recording in the appropriate predetermined category in the database.

12. The method as set forth in claim 9, wherein the monitoring system is in wireless communication with the server.

13. The method as set forth in claim 9 further comprising the step of:

storing within a memory storage device of the monitoring system at least one of a message library and an alarm signal library containing respective message and alarm data.

14. The method as set forth in claim 9, wherein the monitoring system is in wireless communication with at least one of the plurality of detectors.

15. The method as set forth in claim 9, wherein the monitoring system is powered from an independent power source using a hydraulic motor with the work platform to electrically insulate the work platform to prevent risk of electrical shock.

16. The method as set forth in claim 9 further comprising the step of:

providing, via the monitoring system, active controls for an operator to receive and access one of at least diagnostic, training, and safety procedural data.

17. The method as set forth in claim 9, wherein the first operational condition indicating movement of the work platform comprises and indication of activation of a switch of the work platform.

* * * * *